United States Patent
Nuzman et al.

(10) Patent No.: US 9,722,664 B2
(45) Date of Patent: Aug. 1, 2017

(54) DETECTION OF DEMAPPING ERRORS

(71) Applicant: Alcatel-Lucent, Boulogne-Billancourt (FR)

(72) Inventors: Carl Nuzman, Union, NJ (US); Dirk Vanderhaegen, Wemmel (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/904,579

(22) PCT Filed: Jul. 31, 2014

(86) PCT No.: PCT/EP2014/066525
§ 371 (c)(1),
(2) Date: Jan. 12, 2016

(87) PCT Pub. No.: WO2015/018740
PCT Pub. Date: Feb. 12, 2015

(65) Prior Publication Data
US 2016/0156383 A1    Jun. 2, 2016

(30) Foreign Application Priority Data

Aug. 6, 2013  (EP) ..................................... 13306127

(51) Int. Cl.
*H04B 3/487*    (2015.01)
*H04L 5/00*     (2006.01)
(Continued)

(52) U.S. Cl.
CPC ........... *H04B 3/487* (2015.01); *H04L 5/0048* (2013.01); *H04L 25/022* (2013.01);
(Continued)

(58) Field of Classification Search
CPC ..... H04B 3/487; H04L 5/0048; H04L 25/022; H04L 25/0222; H04L 25/023; H04L 25/0242; H04M 3/306; H04M 3/34
See application file for complete search history.

(56) References Cited

U.S. PATENT DOCUMENTS

2009/0310502 A1    12/2009  Nuzman et al.
2010/0202554 A1     8/2010  Kramer et al.
(Continued)

FOREIGN PATENT DOCUMENTS

EP         2136477 A1    12/2009
WO    WO-2012057954 A1     5/2012
(Continued)

OTHER PUBLICATIONS

International Search Report PCT/ISA/210 for International Application No. PCT/EP2014/066525 dated Oct. 23, 2014.
(Continued)

*Primary Examiner* — David B. Lugo
(74) *Attorney, Agent, or Firm* — Harness, Dickey & Pierce, P.L.C.

(57) ABSTRACT

At least one crosstalk probing sequence out of a set of orthogonal crosstalk probing sequences is assigned to the at least one respective disturber line for modulation at the given carrier frequency of at least one respective sequence of crosstalk probing symbols, and error samples are successively measured by a receiver coupled to the victim line at the given carrier frequency while the at least one sequence of crosstalk probing symbols are being transmitted over the at least one respective disturber line are fed back for crosstalk estimation. The received error samples are next correlated with at least one unassigned crosstalk probing
(Continued)

sequence out of the set of orthogonal crosstalk probing sequences for detection of a demapping error in the received error samples.

15 Claims, 8 Drawing Sheets

(51) Int. Cl.
H04L 25/02 (2006.01)
H04M 3/30 (2006.01)
H04M 3/34 (2006.01)

(52) U.S. Cl.
CPC ........ *H04L 25/023* (2013.01); *H04L 25/0222* (2013.01); *H04L 25/0242* (2013.01); *H04M 3/306* (2013.01); *H04M 3/34* (2013.01)

(56) References Cited

U.S. PATENT DOCUMENTS

2010/0232486 A1* 9/2010 Starr ................. H04B 3/32 375/222
2014/0241384 A1* 8/2014 Du .................... H04L 27/2613 370/515
2015/0326380 A1* 11/2015 Verbin ................. H04L 5/1438 370/252
2016/0080031 A1* 3/2016 Kassel ................ H04M 11/062 379/406.06

FOREIGN PATENT DOCUMENTS

WO   WO 2012102917 A1   8/2012
WO   WO-2013044264 A1   3/2013

OTHER PUBLICATIONS

Written Opinion of the International Searching Authority PCT/ISA/237 for International Application No. PCT/EP2014/066525 dated Oct. 23, 2014.

* cited by examiner

DETECTION OF DEMAPPING ERRORS

CROSS-REFERENCE TO RELATED APPLICATIONS

This is a National Phase of PCT Patent Application No. PCT/EP2014/066525, filed on Jul. 31, 2014, and claims priority to, European Application No. 13306127.5, filed Aug. 6, 2013, the contents of each of which are hereby incorporated by reference in their entirety.

TECHNICAL FIELD OF THE INVENTION

The present invention relates to crosstalk estimation within a wired communication system.

TECHNICAL BACKGROUND OF THE INVENTION

Crosstalk (or inter-channel interference) is a major source of channel impairment for Multiple Input Multiple Output (MIMO) wired communication systems, such as Digital Subscriber Line (DSL) communication systems.

As the demand for higher data rates increases, DSL systems are evolving toward higher frequency bands, wherein crosstalk between neighboring transmission lines (that is to say transmission lines that are in close vicinity over part or whole of their length, such as twisted copper pairs in a cable binder) is more pronounced (the higher frequency, the more coupling).

Different strategies have been developed to mitigate crosstalk and to maximize effective throughput, reach and line stability. These techniques are gradually evolving from static or dynamic spectral management techniques to multi-user signal coordination (or vectoring).

One technique for reducing inter-channel interference is joint signal precoding: the transmit data symbols are jointly passed through a precoder before being transmitted over the respective communication channels. The precoder is such that the concatenation of the precoder and the communication channels results in little or no inter-channel interference at the receivers.

A further technique for reducing inter-channel interference is joint signal post-processing: the receive data symbols are jointly passed through a postcoder before being detected. The postcoder is such that the concatenation of the communication channels and the postcoder results in little or no inter-channel interference at the receivers.

The choice of the vectoring group, that is to say the set of communication lines, the signals of which are jointly processed, is rather critical for achieving good crosstalk mitigation performances. within a vectoring group, each communication line is considered as a disturber line inducing crosstalk into the other communication lines of the group, and the same communication line is considered as a victim line receiving crosstalk from the other communication lines of the group. Crosstalk from lines that do not belong to the vectoring group is treated as alien noise and is not canceled.

Ideally, the vectoring group should match the whole set of communication lines that physically and noticeably interact with each other. Yet, local loop unbundling on account of national regulation policies and/or limited vectoring capabilities may prevent such an exhaustive approach, in which case the vectoring group would include a sub-set only of all the physically interacting lines, thereby yielding limited vectoring gains.

Signal vectoring is typically performed within a Distribution Point Unit (DPU), wherein all the data symbols concurrently transmitted over, or received from, all the subscriber lines of the vectoring group are available. For instance, signal vectoring is advantageously performed within a Digital Subscriber Line Access Multiplexer (DSLAM) deployed at a Central office (co) or as a fiber-fed remote unit closer to subscriber premises (street cabinet, pole cabinet, etc). Signal precoding is particularly appropriate for downstream communication (toward customer premises), while signal post-processing is particularly appropriate for upstream communication (from customer premises).

Linear signal precoding and post-processing are advantageously implemented by means of matrix products.

For instance, a linear precoder performs a matrix-product of a vector of transmit frequency samples with a precoding matrix, the precoding matrix being such that the overall channel matrix is diagonalized, meaning the off-diagonal coefficients of the overall channel, and thus the inter-channel interference, mostly reduce to zero. Practically, and as a first order approximation, the precoder superimposes anti-phase crosstalk pre-compensation signals over the victim line along with the direct signal that destructively interfere at the receiver with the actual crosstalk signals from the respective disturber lines.

Similarly, a linear postcoder performs a matrix-product of a vector of received frequency samples with a crosstalk cancellation matrix, the crosstalk cancellation matrix being such that the overall channel matrix is diagonalized too.

It is of utmost importance thus to get an accurate estimate of the actual crosstalk channels in order to appropriately initialize or update the precoder or postcoder coefficients. In the recommendation entitled "*Self-FEKT Cancellation (Vectoring) For Use with VDSL2 Transceivers*", ref. G.993.5, and adopted by the International Telecommunication Union (ITU) on April 2010, the transceiver are configured to send downstream or upstream pilot sequences over the so-called SYNC symbols, which occur periodically after every 256 DATA symbols. In G.993.5 recommendation, it is further assumed that the access node transmits and receives the SYNC symbols over the vectored lines synchronously (super frame alignment) so as pilot signal transmission and interference measurements are carried out synchronously over the respective transmission lines.

On a given victim line, error samples, which comprise both the real and imaginary part of the slicer error (or receive error vector) as measured for a specific SYNC symbol on a per tone or group-of-tones basis are reported to a vectoring controller for further crosstalk estimation. The error samples are correlated with a given pilot sequence transmitted over a given disturber line in order to obtain the crosstalk coupling function from that disturber line. To reject the crosstalk contribution from the other disturber lines, the pilot sequences are made orthogonal to each other, for instance by using Walsh-Hadamard sequences comprising '+1' and '−1' anti-phase symbols. The crosstalk estimates are used for initializing the precoder or postcoder coefficients.

Once the precoder or postcoder coefficients are initialized, the crosstalk coefficients keep on being tracked for any channel variation, as well as for any residual error in the initial estimates of the crosstalk channels. This is typically achieved by means of iterative update methods, such as Least Mean Square (LMS) methods, which gradually converges towards the optimal solution with respect to a given cost function, presently the power of the residual crosstalk signal.

In the idealized linear model, orthogonal pilot sequences as per G.993.5 recommendation are very effective and always produce accurate and unbiased estimates of the crosstalk channels (initialization) or of the residual crosstalk channels (tracking). Yet, due to non-linear effects, the crosstalk estimates can have an undesired offset (or bias) that drives the precoder or postcoder coefficients away from the actual crosstalk channels.

In high crosstalk environments for instance, the sum of the crosstalk vectors from all the pilot sequences transmitted over all the disturber lines can be such that the receive frequency sample goes beyond the decision boundary of the demodulator. As a result, the error vector is reported against the wrong constellation point, yielding an offset in the estimate of the nominal or residual crosstalk channel.

In G.993.5 recommendation, the ideal expected transmit vector is estimated by the receiver. The set of vectors that can be used as pilots is restricted to two states: a normal state (+1) and an inverted state (−1), which is equivalent to Binary Phase Shift Keying (BPSK) modulation. The receiver determines what the transmit vector is expected to be (further referred to as demapping operation) based on determining the most probable half-plane, and this using only information of the specific tone itself. Quadrature Phase Shift Keying (QPSK or 4-QAM) demodulation could alternatively be used for pilot detection, in which case demapping is based on determining the most probable quadrant.

In the event of demapping errors, that is to say when the receiver selects a constellation point different from the transmit constellation point, the reported slicer error has a completely wrong value. This leads to major inaccuracies in the calculation of the crosstalk coupling coefficients, and thus of the precoder and postcoder coefficients, as the vectoring controller is not aware of the fact that a demapping error has occurred within the receiver.

A possible known solution for dealing with demapping errors would be to use multiple demapping decisions across multiple tones. Given that all probe tones in a particular SYNC symbol are all modulated with the same particular bit from of a given pilot sequence, one can use multiple tones to do a joint estimation. This technique is more robust than the straightforward per-tone decision, but in very low Signal to Noise Ratio (SNR) environments, the receiver could still make a wrong decision. If Frequency Dependent Pilot Sequence (FDPS) is used, the technique can still be applied, using the fact that the pilot values repeat periodically after a given number of tones.

Yet, experiments in the field indicate that at least some receiver models keep on using per-tone decision, with either a BPSK or 4-QAM demodulation grid, thereby increasing the likelihood of demapping errors.

Another known solution is the communication of the used pilot sequence to the receiver. The advantage is that the receiver does not need to make a decision anymore. The disadvantage is that sending a message each time in order to change the pilot sequence is cumbersome, introduces delays in the initialization process, and reduces the flexibility for the vectoring controller to change the pilot sequence on the fly.

Still another known solution is the reporting of the full received vector. The advantage is that the receiver does not need to make a decision anymore. However, this solution suffers from a resolution problem: in case of high SNR, one wants to realize a very high cancellation depth. A reduction of the crosstalk to a level below the noise would mean that the error signal will be reduced to very small values compared to the received vector. The most efficient option for error feedback in G.993.5 recommendation makes use of a binary floating point format. As the error vector gets smaller during the convergence process, the exponent decreases, maintaining a constant relative quantization error. Therefore, the absolute quantization error decreases during convergence, even with a small number of bits for error feedback. If the full received vector is to be reported, the word length needs to be such that at the MSB side it can represent the largest direct signal and at the LSB side it can represent the smallest error signal. Therefore, a certain absolute inaccuracy is present. In the last stages of convergence, this absolute quantization error yields a relatively large inaccuracy. To counteract this, many bits would be required to encode the received vector, which would increase the required bandwidth for measurement feedback and thus would reduce the upstream data rate for the end-user.

SUMMARY OF THE INVENTION

It is an object of the present invention to alleviate or overcome the aforementioned shortcoming or drawbacks of the known solutions.

In accordance with a first aspect of the invention, a vectoring controller for estimating at least one crosstalk coefficient at a given carrier frequency from at least one respective disturber line towards a victim line of a vectoring group is configured to assign at least one crosstalk probing sequence out of a set of orthogonal crosstalk probing sequences to the at least one respective disturber line for modulation at the given carrier frequency of at least one respective sequence of crosstalk probing symbols, and to receive error samples as successively measured by a receiver coupled to the victim line at the given carrier frequency while the at least one sequence of crosstalk probing symbols are being transmitted over the at least one respective disturber line. The vectoring controller is further configured to correlate the received error samples with at least one unassigned crosstalk probing sequence out of the set of orthogonal crosstalk probing sequences for detection of a demapping error in the received error samples. The at least one unassigned crosstalk probing sequence is not actively used by any line of the vectoring group during the transmission of the at least one sequence of crosstalk probing symbols over the at least one respective disturber line.

In one embodiment of the invention, the vectoring controller is further configured to keep a desired number M of crosstalk probing sequences out of the set of orthogonal crosstalk probing sequences unassigned and available for detection of demapping errors.

In one embodiment of the invention, the set of orthogonal crosstalk probing sequences comprises crosstalk probing sequences of length L greater than or equal to N+M, N denoting the size of the vectoring group.

In one embodiment of the invention, the vectoring controller is further configured, if a demapping error is detected in the received error samples, to discard the received error samples for estimation of the at least one crosstalk coefficient.

In one embodiment of the invention, the vectoring controller is further configured to estimate the at least one crosstalk coefficient using a weighted combination of a new crosstalk estimate based on the received error samples and at least one further crosstalk estimate. The weight applied to the new crosstalk estimate is a function of whether a demapping error has been detected in the received error samples In one embodiment of the invention, the vectoring controller is further configured to estimate the at least one crosstalk coefficient using a weighted combination of a new crosstalk estimate based on the received error samples and at least one further crosstalk estimate. The vectoring controller is further configured to correlate the received error samples with the at least one unassigned crosstalk probing sequence in order to determine how reliable the new crosstalk estimate is. The weight applied to the new crosstalk estimate is a function of the so-determined reliability of the new crosstalk estimate.

In one embodiment of the invention, the at least one further crosstalk estimate is a crosstalk estimate obtained during a previous crosstalk estimation cycle.

In one embodiment of the invention, the at least one further crosstalk estimate is a crosstalk estimate obtained at a further carrier frequency nearby the given carrier frequency.

In one embodiment, the received error samples are indicative of error vectors between received frequency samples at the given carrier frequency and respective selected constellation points onto which the received frequency samples are demapped.

In one embodiment of the invention, the vectoring controller is further configured to use the result of the correlation of the received error samples with the at least one unassigned crosstalk probing sequence in a statistic, and to compare that statistic with a threshold to determine with a certain confidence whether a demapping error is present in the received error samples.

In one embodiment of the invention, the threshold value depends on the noise level at the given carrier frequency.

In one embodiment of the invention, the statistic is given by $$\max\left\{\frac{1}{M}\sum_m |u_m|, \frac{1}{M}\sum_m |v_m|\right\}.$$

M is a non-null positive integer denoting a given number of unassigned pilot sequences for detection of demapping errors; $u_m$ and $v_m$ denote the real and imaginary part respectively of the correlation of the error samples with a given one of the at least one unassigned crosstalk probing sequence.

Such a vectoring controller typically forms part of an access node that supports wired communication from/to subscriber devices over an access plant, such as a DSLAM, an Ethernet switch, an edge router, etc, and deployed at a co or as a fiber-fed remote unit closer to subscriber premises (street cabinet, pole cabinet, etc).

In accordance with another aspect of the invention, a method for estimating at least one crosstalk coefficient at a given carrier frequency from at least one respective disturber line towards a victim line of a vectoring group comprises assigning at least one crosstalk probing sequence out of a set of orthogonal crosstalk probing sequences to the at least one respective disturber line for modulation at the given carrier frequency of at least one respective sequence of crosstalk probing symbols, and receiving error samples as successively measured by a receiver coupled to the victim line at the given carrier frequency while the at least one sequence of crosstalk probing symbols are being transmitted over the at least one respective disturber line. The method further comprises correlating the received error samples with at least one unassigned crosstalk probing sequence out of the set of orthogonal crosstalk probing sequences for detection of a demapping error in the received error samples. The at least one unassigned crosstalk probing sequence is not actively used by any line of the vectoring group during the transmission of the at least one sequence of crosstalk probing symbols over the at least one respective disturber line.

Embodiments of a method according to the invention correspond with the embodiments of a vectoring controller according to the invention.

The basic idea is to reserve a number of pilot sequences within the set of available pilot sequences for the purpose of detecting decision errors in error feedback. Those reserved or unassigned pilot sequences shall not be actively used for crosstalk estimation, and more specifically shall not be used during the course of the targeted crosstalk estimation cycle. This is achieved either by using pilot sequences of length greater than the size of the vectoring group, or by restricting crosstalk estimation during a given crosstalk estimation cycle to a subset of the vectored lines, and targeting the so-excluded lines during one or more previous or subsequent crosstalk estimation cycles.

Next, the error samples gathered during a given crosstalk estimation cycle are correlated with each one of the unassigned pilot sequences so as to determine whether one or more demapping errors are present in the reported error samples. Appropriate statistics and corresponding thresholds are determined to detect demapping errors within a certain confidence interval, as set forth in the detailed description here below. The detector is designed such that the missed detection rate (no demapping error is detected although one or more demapping errors did occur) is kept below a given confidence threshold (e.g., 0.01), while the false alarm rate (a demapping error is detected although none occurred) is not excessive (e.g., remains below 50%). For a given noise level, the higher the number of unassigned pilot sequences available for detection of demapping errors, the more reliable the statistics.

If a demapping error is detected, then some corrective actions are made to alleviate the impact of the demapping error on crosstalk estimation and vectoring performances. In one embodiment, the corrective action is to disregard crosstalk estimates produced using error feedback corrupted by a demapping error. In another embodiment, the weighting factor used to combine a corrupted crosstalk estimate with previous estimates or with estimates made on nearby tones could be smaller than the weighting factor used when a crosstalk estimate is not corrupted.

The proposed algorithm can be used for both downstream and upstream communication, yet is particularly helpful for downstream communication. Indeed, for upstream communication, knowledge about the pilot sequences used over the respective line are directly available at the DPU (provided demapping information are supplied by the line chipset) and can be used to correct any wrong decisions made by the upstream receiver.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
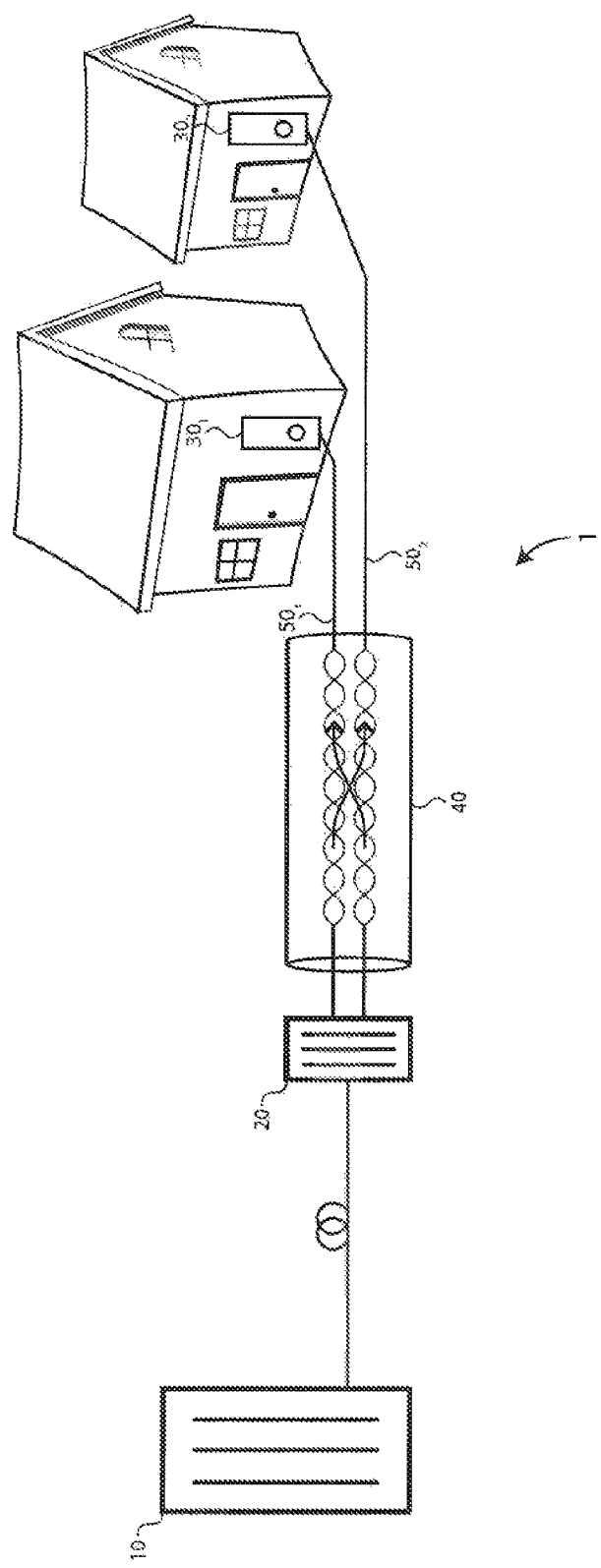
FIG. 1 represents an overview of an access plant.

There is seen in FIG. 1 an access plant 1 comprising a network unit 10 at a CO, a remotely-deployed DPU 20 coupled via one or more optical fibers to the network unit 10, and further coupled via a copper loop plant to Customer Premises Equipment (CPE) 30 at various subscriber premises.

The copper loop plant comprises a common access segment 40, wherein the subscriber lines are in close vicinity with each other and thus induce crosstalk into each other, and dedicated loop segments 50 for final connection to the subscriber premises. The transmission media is typically composed of high-category copper Unshielded Twisted Pairs (UTP).

The DPU 20 comprises a vectoring processing unit for jointly processing the data symbols that are being transmitted over, or received from, the loop plant in order to mitigate the crosstalk induced within the common access segment and to increase the communication data rates achievable over the respective subscriber lines.

Figure 2:
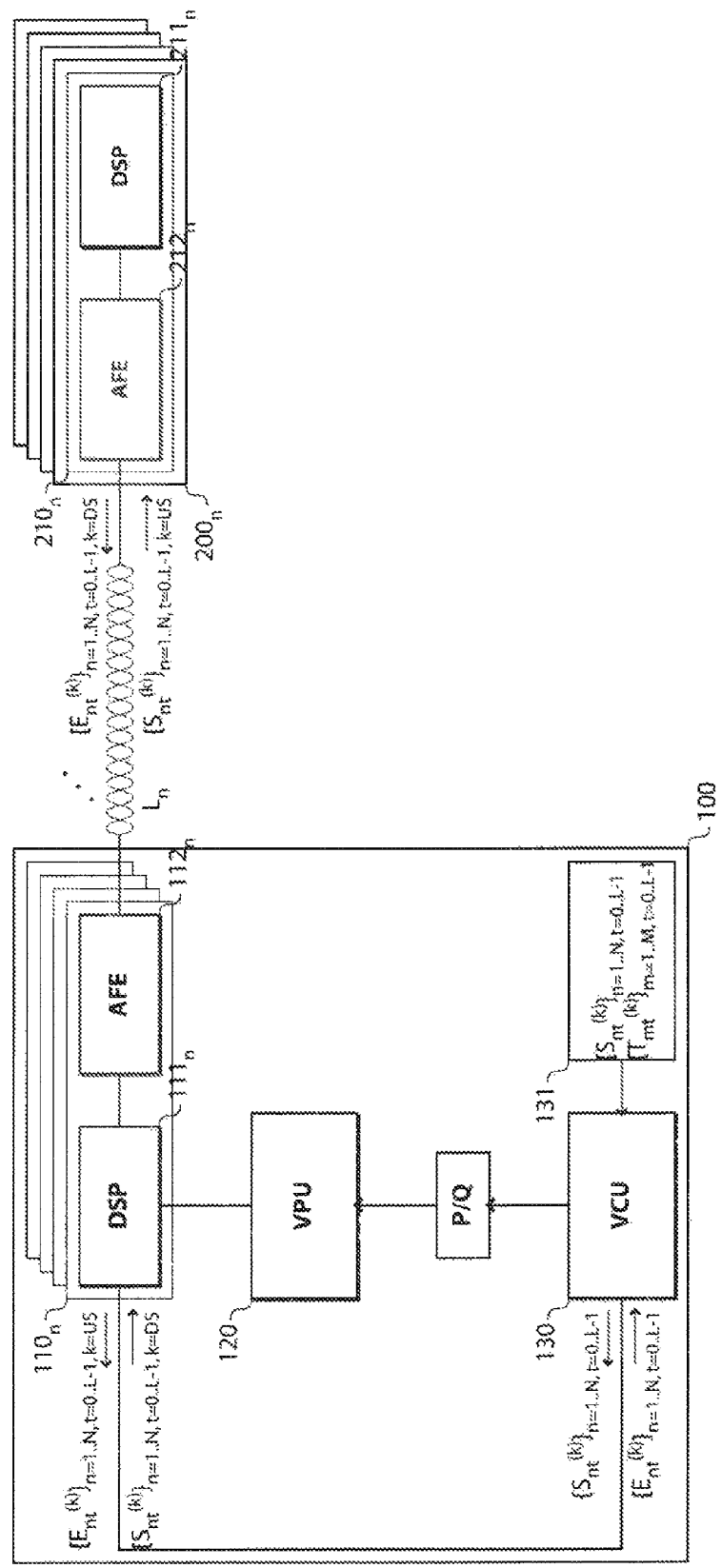
FIG. 2 represents an access node as per the present invention.

There is seen in FIG. 2 a DPU 100 as per the present invention coupled to N CPEs $200_1$ to $200_N$ through N respective transmission lines $L_1$ to $L_N$, which are assumed to form part of the same vectoring group.

The DPU 100 comprises:
N DSL transceivers $110_1$ to $110_N$;
a Vectoring Processing Unit 120 (or VPU); and
a Vectoring Control Unit 130 (or VCU) for controlling the operation of the VPU 120.

The transceivers 110 are individually coupled to the VPU 120 and to the VCU 130. The VCU 130 is further coupled to the VPU 120.

The transceivers 110 respectively comprise:
a Digital Signal Processor (DSP) 111; and
an Analog Front End (AFE) 112.

The CPEs 200 comprise respective DSL transceivers 210.
The DSL transceivers 210 respectively comprise:
a Digital Signal Processor (DSP) 211; and
an Analog Front End (AFE) 212.

The AFEs 112 and 212 respectively comprise a Digital-to-Analog Converter (DAC) and an Analog-to-Digital Converter (ADC), a transmit filter and a receive filter for confining the signal energy within the appropriate communication frequency bands while rejecting out-of-band interference, a line driver for amplifying the transmit signal and for driving the transmission line, and a Low Noise Amplifier (LNA) for amplifying the receive signal with as little noise as possible.

The AFEs 112 and 212 further comprise a hybrid for coupling the transmitter output to the transmission line and the transmission line to the receiver input while achieving low transmitter-receiver coupling ratio, impedance-matching circuitry for adapting to the characteristic impedance of the transmission line, and isolation circuitry (typically a transformer).

The DSPs 111 and 211 are respectively configured to operate downstream and upstream DSL communication channels.

The DSPs 111 and 211 are further configured to operate downstream and upstream DSL control channels that are used to transport DSL control traffic, such as diagnosis or management commands and responses. Control traffic is multiplexed with user traffic over the DSL channel.

More specifically, the DSPs 111 and 211 are for encoding and modulating user and control data into digital data symbols, and for de-modulating and decoding user and control data from digital data symbols.

The following transmit steps are typically performed within the DSPs 111 and 211:
data encoding, such as data multiplexing, framing, scrambling, error control encoding and data interleaving;
signal modulation, comprising the steps of ordering the carriers according to a carrier ordering table, parsing the encoded bit stream according to the bit loadings of the ordered carriers, and mapping each chunk of bits onto an appropriate transmit constellation point (with respective carrier amplitude and phase), possibly with Trellis coding;
signal scaling;
Inverse Fast Fourier Transform (IFFT);
Cyclic Prefix (CP) insertion; and possibly
time-windowing.

The following receive steps are typically performed within the DSPs 111 and 211:
CP removal, and possibly time-windowing;
Fast Fourier Transform (FFT);
Frequency EQualization (FEQ);
signal de-modulation and detection, comprising the steps of applying to each and every equalized frequency sample an appropriate constellation grid, the pattern of which depends on the respective carrier bit loading, detecting the expected transmit constellation point and the corresponding transmit bit sequence, possibly with Trellis decoding, and re-ordering all the detected chunks of bits according to the carrier ordering table; and
data decoding, such as data de-interleaving, error detection and/or correction, de-scrambling, frame delineation and de-multiplexing.

The DSPs 111 are further configured to supply transmit frequency samples to the VPU 120 before Inverse Fast Fourier Transform (IFFT) step for joint signal precoding, and to supply receive frequency samples to the VPU 120 after Fast Fourier Transform (FFT) step for joint signal post-processing.

The DSPs 111 are further configured to receive corrected frequency samples from the VPU 120 for further transmission or detection. Alternatively, the DSPs 111 may receive correction samples to add to the initial frequency samples before further transmission or detection.

The VPU 120 is configured to mitigate the crosstalk induced over the transmission lines. This is achieved by multiplying a vector of transmit frequency samples with a precoding matrix P so as to pre-compensate an estimate of the expected crosstalk (downstream), or by multiplying a vector of receive frequency samples with a crosstalk cancellation matrix Q so as to post-compensate an estimate of the incurred crosstalk (upstream).

In the matrix P or Q, a row n represents a particular victim line $L_n$, while a column m represents a particular disturber line $L_m$. At the intersection, the coupling coefficient that should be applied to the corresponding disturber transmit or receive frequency sample for mitigating over the victim line $L_n$ the crosstalk from the disturber line $L_m$. Not all the coefficients of the matrix need to be determined, for instance on account of limited vectoring capabilities first assigned to the strongest crosstalkers, or still for instance due to the fact that some lines do not noticeably interact with each other. The undetermined coefficients are preferably set to 0.

Also, it is noteworthy that a communication line $L_n$ for which vectoring operation is not supported or not enabled, such as a legacy line, yet that still noticeably interferes with other communication lines, is only considered as a disturber line within the vectoring group. The off-diagonal coefficients of the corresponding $n^{th}$ row of the matrix P or Q are thus all set to 0.

The VCU 130 is basically for controlling the operation of the VPU 120, and more specifically for estimating the crosstalk coefficients between the transmission lines of the vectoring group, and for initializing and updating the coefficients of the precoding matrix P and of the crosstalk cancellation matrix Q from the so-estimated crosstalk coefficients.

The VCU 130 starts first by configuring the respective downstream pilot sequences for use by the transceivers 110 for downstream crosstalk estimation, and the upstream pilot sequences for use by the transceivers 210 for upstream crosstalk estimation. The pilot sequences actively assigned to the transmission lines are denoted as $\{S_n\}_{n=1 \ldots N}$, and are chosen from a set of mutually orthogonal pilot sequences 131.

The VCU 130 further reserves M pilot sequences $\{T_m\}_{m=1 \ldots M}$ from the set of mutually orthogonal pilot sequences 131 for detection of demapping errors only: these pilot sequences are not assigned to any transmission line.

The size of the set of mutually orthogonal pilot sequences 131 shall thus be greater than N+M, and so shall be the length of the pilot sequences $\{S_n\}_{n=1 \ldots N}$ and $\{T_m\}_{m=1 \ldots M}$ so as to fulfill the orthogonality requirement.

Alternatively, the VCU 130 may assign pilot sequences to a restricted set of the transmission lines, thereby freeing up some pilot sequences for detection of demapping errors. As crosstalk from lines that are not assigned any pilot sequence cannot be learned, the VCU 130 needs to re-assign the active pilots during a subsequent crosstalk estimation round so as to acquire the crosstalk coefficients for the whole vectoring group.

The VCU 130 gathers respective slicer errors $\{E_n\}_{n=1 \ldots N}$ as measured during the detection of the pilot digits by the remote transceivers 210 for downstream communication, and by the local transceivers 110 for upstream communication.

Figure 3A:
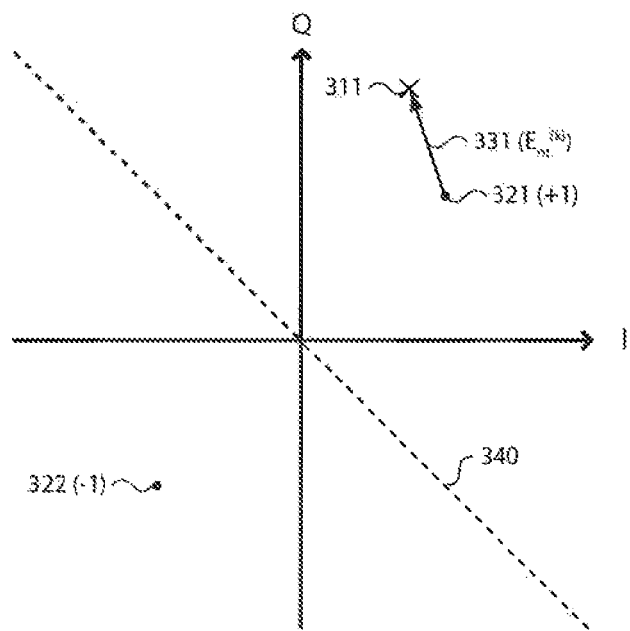
FIGS. 3A and 3B represent the measured error vector of a receive frequency sample without and with a demapping error.

With regard to FIG. 3A, and assuming BPSK is used for modulating and demodulating the pilot signal, the slicer error is defined as the error vector 331 between an equalized receive frequency sample 311 after crosstalk pre-compensation or post-compensation, and a reference constellation point that has been selected by the receiver for demapping the receive frequency sample 311, presently the constellation point 321, which corresponds to the normal state (+1).

The constellation point 322, which corresponds to the inverted state (−1) has been depicted too in FIG. 3A, together with the decision boundary line 340 for demapping the receive frequency sample. If the receive frequency sample 311 belongs to the upper-right half plane delimited by the decision boundary line 340, then the constellation point 321 (+1) is selected as being the most-probable transmit frequency sample; else if the receive frequency sample 310 belongs to the lower-left half plane, then the constellation point 322 (−1) is selected as being the most-probable transmit frequency sample.

Figure 3B:
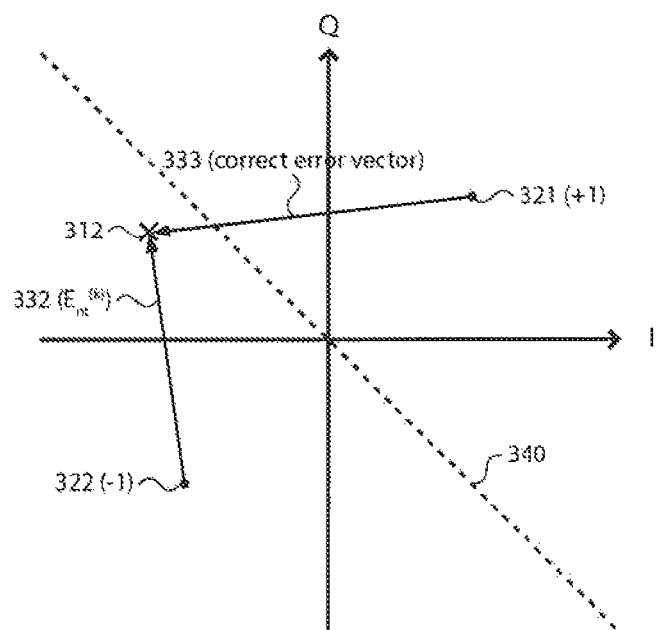

With regard now to FIG. 3B, and still assuming BPSK is used for modulating and demodulating the pilot signal, another received frequency sample 312 is depicted that crosses the decision boundary line 340 on account of strong crosstalk incurred over the transmission line. As a result, the receiver demaps the receive frequency sample onto the wrong constellation point 322 (−1), although the normal state 321 (+1) was transmitted, and thus report the wrong error vector 332, thereby substantially biasing the crosstalk estimation process.

The VCU 130 correlates the error samples $E_n$ on a respective victim line $L_n$ with the pilot sequence $S_m$ transmitted over a respective disturber line $L_m$ in order to estimate the crosstalk coefficients from the disturber line $L_m$ into the victim line $L_n$.

The VCU 130 also correlates the error samples $E_n$ with each one of the unassigned pilot sequences $\{T_m\}_{m=1 \ldots M}$ in order to determine whether any demapping error is present in the error samples. If so, the VCU 130 takes some corrective actions, such as disregarding a new crosstalk estimate based on these corrupted error samples, or applying a lower weight to this new crosstalk estimate when combined with a previous crosstalk estimate or with a crosstalk estimate at a neighboring frequency.

The VCU 130 further correlates the error samples $E_n$ with each one of the unassigned pilot sequences $\{T_m\}_{m=1 \ldots M}$ so as to characterize the variance of the noise affecting a new crosstalk estimate, and thus to determine how reliable this new crosstalk estimate is. This reliability information can further be used when combining this new crosstalk estimate with a previous crosstalk estimate or with a crosstalk estimate at a neighboring frequency, for instance using minimum variance combining.

We now give a mathematical model for a DSL system as per FIG. 2, and we derive a reliable statistic to detect demapping errors in the received error samples for use by the VCU 130.

Channel Model

Consider a system with N DSL lines in a vectoring group. Communication takes place on K DMT tones, labeled 0 through K−1. The tones may be thought as independent channels; we focus attention on a specific tone k. In general we will use a superscript such as $x^{(k)}$ to denote the tone index whenever necessary. Both downstream and upstream operations are considered.

In a frequency-domain model of the system, let complex signals $\Lambda x^{(k)}$ be the vector of complex signals to be sent downstream on lines $L_1$ to $L_N$ on tone k, where $\Lambda$ is a diagonal matrix with entries $\Lambda_{nn} = \sigma_n$, where $\sigma_n^2$ is the transmit power on line $L_n$, and where $x_n$ is a unit power complex signal to be transmitted downstream onto line $L_n$.

Then, $L_n$ the absence of vectoring, the received signal at the receivers 210 is:

$$\tilde{r}=H\Lambda x+\tilde{z},$$

where H is a N×N channel matrix, with element $H_{nn}$ representing direct channel gain and element $H_{nm}$ representing crosstalk from line $L_m$ into line $L_n$,
and where $\tilde{z}$ represents background noise.

If we apply precoding with precoding matrix P=I+C, we have:

$$\tilde{r}=\tilde{R}\Lambda x+\tilde{z},$$

where $\tilde{R}=H(I+C)$ is the residual channel matrix.

We decompose the channel matrix as H=D(I+G), where D is a diagonal matrix of direct gains $D_{nn}=H_{nn}$, and G is the receiver-referred relative crosstalk channel matrix with entries $G_{nm}=H_{nm}/H_{nn}$ for m≠n and $G_{nn}=0$.

Prior to slicing the received signal on a fixed grid, the received signal passes through a Frequency domain Equalizer (FEQ), and the transmit power is compensated for. The result of these two operations is the normalized received signal:

$$r=\Lambda^{-1}D^{-1}\tilde{r}=\Lambda^{-1}R\Lambda x+z=x+\Lambda^{-1}\Theta\Lambda x+z,$$

where $R=D^{-1}\tilde{R}=(I+G)(I+C)$ and $Z=\Lambda^{-1}D^{-1}\tilde{z}$ are the normalized residual channel matrix and background noise respectively, and where $\Theta=R-I=G+C+GC$ is the normalized residual crosstalk channel matrix.

During SYNC symbols, the transmitted values $x_n$ can be estimated with high reliability by the receiver $210_n$, and subtracted from the received signal to form an error signal. In vector form the error signal is given by:

$$e=r-x=\Lambda^{-1}\Theta\Lambda x+z \qquad (1).$$

When error feedback is operational, these complex error values are sent back to the VCE, and can be used to estimate the normalized residual crosstalk channel matrix $\Theta$, which we wish to drive to zero.

Now let complex signals $\Lambda x$ be the vector of complex signals to be sent upstream on lines $L_1$ to $L_N$ on tone k, where $\Lambda$ is a diagonal matrix with entries $\Lambda_{nn}=\sigma_n$, where $\sigma_n^2$ is the transmit power on line $L_n$, and where $x_n$ is a unit power complex signal to be transmitted upstream onto line $L_n$. Then, in the absence of vectoring, the received signal at the receivers 110 is:

$$\tilde{r}=H\Lambda x+\tilde{z},$$

where H is a N×N channel matrix, with element $H_{nn}$ representing direct channel gain and element $H_{nm}$ representing crosstalk from line $L_m$ into line $L_n$,
and where $\tilde{z}$ represents background noise.

In the upstream direction, we decompose the channel matrix as $H=(I+\tilde{G})D$, where D is a diagonal matrix of direct gains $D_{nn}=H_{nn}$, and where $\tilde{G}$ is the transmitter-referred relative crosstalk matrix with entries $\tilde{G}_{nm}=H_{nm}/H_{mm}$ for m≠n and $\tilde{G}=0$.

The use of different notations downstream and upstream are useful. One important property is that with these notations, the relative crosstalk coefficients are typically much smaller than unity, even when lines of different lengths are present. In downstream, the channels $H_{nm}$ and $H_{nn}$ both have the same propagation distance; the distance is a function of the receiver 210n. In upstream on the other hand, it is the channels $H_{nm}$ and $H_{mm}$ that cover the same propagation distance; here the distance is a function of the transmitter 210m.

We apply postcoding with postcoding matrix Q=I+C, followed by frequency equalization (FEQ), represented by a diagonal matrix F, and power normalization. The receiver adapts F to be the inverse of the postcoded channel (I+C)H, which in case of small crosstalk, yields $F\approx D^{-1}$. The compensated signal after these three operations is thus given by:

$$y=\Lambda^{-1}F(I+C)\tilde{r}=\Lambda^{-1}FR\Lambda x+z,$$

where $R=(I+C)(I+\tilde{G})$ is the normalized residual channel matrix and where the noise term is $z=\Lambda^{-1}F(I+C)\tilde{z}\approx \Lambda^{-1}D^{-1}\tilde{z}$.

The noise term depends on the postcoder setting, but this dependence can be ignored if the coefficients of C are small relative to unity, as should be the case in practice.

In general, we define $\Theta=R-I$ to be the normalized residual crosstalk channel matrix. We wish to drive this residual crosstalk to zero.

During SYNC symbols, the transmitted values $x_n$ can be estimated with high reliability by the receiver $110_n$, and subtracted from the compensated signal r to form an error signal. In vector form the error signal is given by:

$$e=y-x=\Lambda^{-1}F\Theta D\Lambda x+z \qquad (2).$$

When error feedback is operational, these complex error values are forwarded to the VCE 130, and can be used to estimate the residual crosstalk channel $\Theta$, which we want to drive to zero.

Crosstalk Estimation Algorithm

Because the mapping from the residual crosstalk channel $\Theta$ to the error samples e is very similar in downstream (1) and upstream (2), the remainder of this description is largely common for upstream and downstream. However, it should be kept in mind that the quantity z has a slightly different meanings in upstream versus downstream. Also, where receiver referred relative crosstalk G is referenced when describing downstream communication, it should be replaced by the transmitter-referred relative crosstalk $\tilde{G}$ when describing upstream communication.

For pilot-based crosstalk estimation, we send pilot sequences on the SYNC symbols. That is, define a N×L pilot matrix S, where $S_{nt}$ is a binary value '1' or '−1', that will modulate the complex symbol sent on line n at time t. The sequence is repeated with period L, that is the value sent at time t is $S_{n\tau}$ with $\tau=t \bmod L$. We choose S to be orthogonal, meaning that $SS^T=LI_N$, that is L times the N×N identity matrix.

Denote by $a=(1+j)/\sqrt{2}$ the 4-QAM constellation point 00, scaled to unit power, with −a the point 11. The values sent on the SYNC symbol period t are then $x_n(t)=aS_{nt}$.

For downstream, the error symbols received on all lines over L consecutive SYNC symbols can be written in N×L matrix notation as:

$$E=a\Lambda^{-1}\Theta\Lambda S+Z.$$

Correlating the sequence of error samples received on each line with each of the pilot sequences can be represented in matrix notation by right-multiplying the error matrix E by the transpose of the pilot sequence. The resulting unnormalized correlations are of the form:

$$U=ES^T=a\Lambda^{-1}\Theta\Lambda SS^T+ZS^T=aL\Lambda^{-1}\Theta\Lambda+ZS^T.$$

Note that this correlation operation only involves adding and subtracting complex error samples—there are no multiplications required. Finally, the unnormalized correlations are normalized to obtain unbiased estimates of the residual crosstalk. Namely:

$$\hat{\Theta}_{nm} = U_{nm}\left(\frac{\sigma_n}{\sigma_m}\right)\left(\frac{1}{aL}\right) = \Theta_{nm} + W_{nm}, \quad (3)$$

where the noise term is:

$$w_{nm} = \left(\frac{\sigma_n}{\sigma_m}\right)\left(\frac{1}{aL}\right)\sum_{t=0}^{L-1} Z_{nt}S_{mt}.$$

A quick calculation shows that the variance of the crosstalk estimate is:

$$\text{var}[\hat{\Theta}_{nm}] = E[|w_{nm}|^2] = \left(\frac{\sigma_n^2}{\sigma_m^2}\right)\frac{E[|Z_n|^2]}{L}.$$

For upstream now, the error symbols received on lines $L_1$ to $L_n$ over L consecutive SYNC symbols can be written in N×L matrix notation as:

$$E = a\Lambda^{-1}F\Theta D\Lambda S + Z.$$

Correlating the sequence of error samples received on each line with each of the pilot sequences can be represented in matrix notation by right-multiplying the error matrix E by the transpose of the pilot sequence. The resulting unnormalized correlations are of the form:

$$U = ES^T = a\Lambda^{-1}F\Theta D\Lambda SS^T + ZS^T = aL\Lambda^{-1}F\Theta D\Lambda + ZS^T.$$

Note again that this correlation operation only involves adding and subtracting complex error samples—there are no multiplications required. Finally, the unnormalized correlations are normalized to obtain unbiased estimates of the residual crosstalk. Namely:

$$\hat{\Theta}_{nm} = U_{nm}\left(\frac{\sigma_n}{F_{nn}H_{mm}\sigma_m}\right)\left(\frac{1}{aL}\right) = \Theta_{nm} + w_{nm}, \quad (4)$$

where the noise term is:

$$w_{nm} = \left(\frac{\sigma_n}{F_{nn}H_{mm}\sigma_m}\right)\left(\frac{1}{aL}\right)\sum_{t=0}^{L-1} Z_{nt}S_{mt}.$$

A quick calculation shows that the variance of the crosstalk estimate is:

$$\text{var}[\hat{\Theta}_{nm}] = E[|w_{nm}|^2] = \left(\frac{\sigma_n^2}{|F_{nn}|^2|H_{mm}|^2\sigma_m^2}\right)\frac{E[|Z_n|^2]}{L}.$$

Impact of Demapping Errors

In the previous section, we assumed that the receiver had a correct estimate of the transmitted pilot symbols $aS_{nt}$. Depending on the noise and interference conditions, and on the estimation method used by the receiver, this assumption may not always hold.

In what follows, we assume that the receiver always demaps to one of the four QPSK constellation points independently for each subcarrier (which is the worst situation), and examine the consequences that occur when the demapped point is not equal to $aS_{nt}$.

The error feedback received on all lines in a pilot cycle is:

$$E = a\Lambda^{-1}R\Lambda S - a\hat{S},$$

where $\hat{S}$ is the matrix of demapped signals.

We can write $a\hat{S}_{nt} = (a - \sqrt{2}U_{nt} - i\sqrt{2}V_{nt})S_{nt}$, where $U_{nt}\in\{0,1\}$ represents the number of real demapping errors and $V_{nt}\in\{0,1\}$ represents the number of imaginary demapping errors made by receiver n at time t. In most cases (i.e., most tones in most topologies) matrices U and V are zero. In many other cases, U and V may be sparse matrices, containing a few non-zero elements. For tones with very low SNR, U and V could be dense. To simplify notation, we may also define $W = aS - a\hat{S} = \sqrt{2}(U+iV)\circ S$. Here the operation $C = A\circ B$ denotes element-wise multiplication of matrices, i.e. $C_{nm} = A_{nm}B_{nm}$ for each row index n and column index m. We then have:

$$E = a\Lambda^{-1}R\Lambda S + Z - aS + W = a\Lambda^{-1}\Theta\Lambda S + Z + W,$$

where Z is the background noise and W the demapping error.

Applying the linear crosstalk estimation algorithm described previously, we obtain the same result as before (an unbiased estimate of $\Theta$), plus an additional term due to W. The additional term, in matrix form, is:

$$\Psi = \frac{1}{aL}\Lambda WS^T\Lambda^{-1}.$$

The estimate of $\Theta_{nm}$ is thus corrupted by a term:

$$\Psi_{nm} = \left(\frac{\sigma_n}{\sigma_m}\right)\left(\frac{1}{aL}\right)\sum_{t=0}^{L-1} W_{nt}S_{mt}.$$

Considering a particular victim line Ln, the sum need only be taken over SYNC symbols experiencing a demapping error, i.e. terms with $W_{nt} = 0$ drop out of the sum.

Suppose that there is only a single demapping error, say $U(n,\tau) = 1$. Then for each disturber Lm, the corruption term is $$\Psi_{nm} = \left(\frac{\sigma_n}{\sigma_m}\right)\left(\frac{\sqrt{2}}{aL}\right)S_{n\tau}S_{m\tau}$$

with magnitude $$|\Psi_{nm}| = \left(\frac{\sigma_n}{\sigma_m}\right)\left(\frac{\sqrt{2}}{L}\right).$$

If the resulting estimate is used to directly adapt the precoder, then to first order, the demapping error increases the interference from each disturber by an additive factor of $$\left(\frac{\sigma_n^2}{\sigma_m^2}\right)\left(\frac{2}{L^2}\right).$$

so that the interference on victim line Ln increases by a total of $$\left(\frac{2}{L^2}\right)\sum_m \left(\frac{\sigma_n^2}{\sigma_m^2}\right).$$

In a system with partial cancellation, the sum is over canceled disturbers since the error term only accrues for non-zero precoder coefficients. When power levels are approximately equal on all lines, the effect of a single error is to add relative interference of strength $2N_d/L^2$, where $N_d$ is the number of canceled disturbers.

For example, in a system with pilots of length L=256 and $N_d$=96 canceled disturbers, a single demapping error will limit the signal to Noise Ratio (SNR) of the victim line to $-10 \log_{10}((2 \times 96)/(256 \times 256))=25$ dB (as signal power is normalized to unity). Additional demapping errors on the given victim line cause a roughly linear increase in interference; hence if the line experienced 10 demapping errors over 256 SYNC symbols, then the SNR would be limited to about 15 dB in this example.

When the precoder is refined over multiple estimation cycles, then the number of demapping errors may change over time. It can happen that a demapping error causes interference that makes further demapping errors more likely, until the system converges to a precoder that is very good at making demapping errors. On the other hand, the system may also converge toward the ideal, with the number of demapping errors decreasing over time.

Let us now determine the impact of demapping errors on crosstalk estimation accuracy. We will focus first on estimating the accuracy of each row of the estimated matrix. This is useful with or without demapping errors.

The key idea is that correlating the error feedback with unassigned pilots, orthogonal to the pilots in use on active lines, provides a good statistical estimate of the level of noise and demapping artifacts affecting the residual crosstalk estimate.

Consider $E_{n.}$ to be the $n^{th}$ row of the error-feedback matrix, representing the error feedback on line $L_n$ over L SYNC symbols. We have:

$$E_{n.}=a\sigma_n^{-1}\Theta_{n.}\Lambda S+Z_{n.}+W_{n.}.$$

If we correlate this error feedback with an assigned pilot $S_{m.}$, we obtain:

$$\rho_n(S_m) := \frac{E_{n.}S_{m.}^T}{L} = a\sigma_n^{-1}\Theta_{nm}\sigma_m + \frac{Z_{n.}S_{m.}^T}{L} + \frac{W_{n.}S_{m.}^T}{L}.$$

The first term is the correct estimate of $\Theta_{nm}$ (before power adjustments and division by a), while the second term represents the influence of background noise and the third term represents the influence of demapping errors.

Let $T_m$ be a $1 \times L$ matrix that is an unassigned pilot sequence orthogonal to the assigned pilots S. If we correlate the error feedback with the unassigned pilot $T_m$, then the term associated with the residual crosstalk channel drops out, and we are left with just a noise term and demapping error term:

$$\rho_n(T_m) := \frac{E_{n.}T_{m.}^T}{L} = \frac{Z_{n.}T_{m.}^T}{L} + \frac{W_{n.}T_{m.}^T}{L}.$$

By examining the size of the result, we get a good idea of the size of the noise and demapping errors affecting the crosstalk estimates.

An exact analysis of this problem is complicated by the fact that W depends on S and Z. To make some headway, we can make some independence approximations. These certainly do not hold when the pilots have deterministic, repetitive structures (as in ordinary Walsh-Hadamard matrices). However, when the pilots are drawn from randomized Walsh-Hadamard structures, and the number of assigned and unassigned pilots N and M is not too small, certain random approximations seem to work reasonably well. In particular, taking the point of view that W is fixed, and that Z and $T_m$ are random, zero-mean, and independent, we have:

$$E[|\rho_n(T_m)|^2] = \frac{1}{L}E[|Z_n|^2] + \frac{1}{L^2}E[\|W_{n.}\|^2] = \frac{1}{L}E[|Z_n|^2] + \frac{1}{L^2}\|W_{n.}\|^2.$$

Making similar approximations with respect to W, $S_{m.}$, and Z, the expected magnitude squared of error terms in $\rho_n(S_m)$ is approximately the same, namely $$E[|\rho_n(S_m)|^2] = \frac{1}{L}E[|Z_n|^2] + \frac{1}{L^2}E[\|W_{n.}\|^2] = \frac{1}{L}E[|Z_n|^2] + \frac{1}{L^2}\|W_{n.}\|^2.$$

Hence, to obtain an estimate of the variance of our correlation result $\rho_n(S_m)$, we may take several unassigned pilots $T_m$ and compute the empirical mean of $|\rho_n(T_m)|^2$. Finally, since $$\hat{\Theta}_{nm} = \rho_n(S_m)\left(\frac{\sigma_n}{\sigma_m}\right)\left(\frac{1}{a}\right),$$

the variance of the $\hat{\Theta}_{nm}$ is $$\left(\frac{\sigma_n^2}{\sigma_m^2}\right)\mathrm{var}(\rho_n(S_m)).$$

Detection of Demapping Errors

By performing signal processing on the unassigned correlation results $\rho_n(T_m)$, we can attempt to detect the presence of demapping errors, determine how many real and imaginary errors there are, or even try to identify the SYNC symbol in which the errors occurred. Here we will focus on the problem of detecting whether at least one demapping error is present.

In this section we design optimal and near-optimal tests for determining whether a single demapping error is present. Having designed an acceptable test for this case, we then can check that it gives acceptable performance for multiple demapping errors.

We are interested in a test between two hypotheses:
$H_0$: No demapping error
$H_1$: A single demapping error is present.

Consider the previous expression for the results of correlating unassigned pilot $T_m$ with the error feedback on a particular victim line:

$$\rho_n(T_m) = \frac{Z_{n.}T_{m.}^T}{L} + \frac{W_{n.}T_{m.}^T}{L}. \quad (5)$$

In what follows, it is convenient to renormalize as $$\tilde{\rho}_n(T_m) = \frac{L}{\sqrt{2}} \rho_n(T_m),$$

so that the normalized demapping errors $$\tilde{W} = \frac{1}{\sqrt{2}} W$$

fall on the complex integer grid. Let us also drop the subscript n (as we can concentrate on one particular victim line), and use the subscript m to refer to the pilot sequence $T_m$. We then have:

$$\tilde{\rho}_m = \frac{1}{\sqrt{2}} \sum_{t=0}^{L-1} Z_t T_{mt} + \sum_{t=0}^{L-1} \tilde{W}_t T_{mt}.$$

Under the null hypothesis, $W_t=0$ for all SYNC symbols t, as we have that $\rho_m$ is complex normal distributed with variance $\eta^2=(L/2)\text{Var}[Z_t]$. Under the non-null hypothesis, there is one particular symbol $\tau$ such that $W_\tau$ has one of the values in the set $\{1, -1, i, -i\}$, and $W_t=0$ for all other SYNC symbols t. Then we can write:

$$\tilde{\rho}_m = z + \tilde{W}_\tau T_{m\tau},$$

where z is the complex normal noise with variance $\eta^2$. We can model the pilot values $T_{m\tau}$ as random equiprobable values from $\{1, -1\}$, and $\tilde{W}_\tau$ as taking its four values with equal probability independent from $T_{m\tau}$.

It is also useful to introduce the notation $\gamma$ for the SNR at the receiver due to background noise (not interference). This is sometimes referred to as the single-user SNR, since it is the SNR obtained when only one user is active. To relate $\gamma$ to previously defined quantities, note that $Z_t$ is the background noise term in a given error sample, and that the signal power at this scale is 2 since the constellation points are $\pm(1+i)$. Hence, in linear scale:

$$\gamma = 2/\text{Var}[Z_t] = L/\eta^2.$$

We now have a well-defined hypothesis test. The Neyman-Pearson lemma provides a technique for obtaining the best possible tradeoffs between false positive (i.e., a demapping error is detected although none occurred) and false negative (i.e, no demapping error is detected although one did actually occur) detection errors in such a test. The optimal tests are of the following form.

Suppose we correlate our error feedback with a set of M unassigned pilots to obtain a vector $\tilde{\rho}=\{\tilde{\rho}_m\}_1^M$. We compute the likelihood ratio $$L(\tilde{\rho}) = \frac{P_1\{\tilde{\rho}\}}{P_0\{\tilde{\rho}\}},$$

i.e. the probability that the vector $\tilde{\rho}$ would occur under the non-null hypothesis relative to the probability that it occurs under the null hypothesis, and declare a detection if the ratio exceeds some specified threshold $\theta$. By varying the threshold, the rates of false positive and false negative detection can be traded off. For example, one can minimize the false positive rate subject to keeping the false negative rate below a prescribed level.

If the likelihood ratio can be expressed as a function of another function of $\tilde{\rho}$, for example if we can write $L(\tilde{\rho})=f(g(\tilde{\rho}))$, then it is sufficient to compute the statistic $g(\tilde{\rho})$ and compare this value to an appropriate threshold. For the problem posed above, we can explicitly write down the likelihood ratio and simplify it to a sufficient statistic. If we write the real and imaginary parts of $\tilde{\rho}_m$ as $\tilde{\rho}_m=u_m+iv_m$, a sufficient statistic turns out to be:

$$g_1(\tilde{\rho}) = \frac{\eta^2}{M} \log\left[\prod_m \left(e^{u_m/\eta^2} + e^{-u_m/\eta^2}\right) + \prod_m \left(e^{v_m/\eta^2} + e^{-v_m/\eta^2}\right)\right].$$

For small $\eta^2$, this sufficient statistic is well approximated by a simpler function:

$$\tilde{g}_1(\tilde{\rho}) = \max\left\{\frac{1}{M}\sum_m |u_m|, \frac{1}{M}\sum_m |v_m|\right\}. \quad (6)$$

A sub-optimal test can be designed by comparing this simpler statistic to a threshold.

Fortunately, it turns out that tests based on the simplified statistic are virtually indistinguishable from the optimal tests in the scenarios we are interested in. Other related statistics, can also be used. The key requirement is that the distribution of the statistic when no demapping errors are present should be as different as possible from the distribution of the statistic when demapping errors are present.

Let us now design an appropriate test for detecting two demapping errors. We have already seen in the performance results that in some cases, two demapping errors can be more difficult to detect than one. This is because in (5), it is possible to have $W_t T_{mt}=W_s T_{ms}$ for two SYNCsymbols t and s, so that the two errors cancel each other out in the correlation with $T_m$. This problem can occur if errors $W_t$ and $W_s$ are both real, or are both imaginary (which we can refer to as identical twins). If one is real and the other imaginary (fraternal twins), then they cannot cancel each other out: this situation is always easier to detect than a single error. In what follows, we therefore focus on the case of identical twins.

One can define optimal hypothesis tests for double demapping errors, following the same approach as above for single demapping errors. However, since single errors are more common than double errors, and because the metric optimized for single errors seems to work well for double errors, we just use the single error metric as our test statistic. In the next section we describe how to determine test thresholds taking both single and double errors into account.

Dependence of Test Statistic on SNR Level

Now that we have chosen a particular test statistic to use, $\tilde{g}_1$, we need to understand how the distribution of this statistic depends on our various hypotheses and on the background noise level. We begin with the following identities. Let $A_{\mu,\lambda}=|\mu+\lambda Z|$ be the absolute value of a normally distributed variable with mean $\mu$ and variance $\lambda^2$. For convenience, we denote the mean and variance of $A_{\mu,\lambda}$ by $m(\mu,\lambda)$ and $v(\mu,\lambda)$ respectively. Then:

$$m(\mu, \lambda) := E[A_{\mu,\lambda}] = \sqrt{2/\pi}\lambda e^{-\mu^2/2\lambda^2} + |\mu|(1 - 2Q(|\mu|/\lambda)),$$

wherein Q denotes the Q-function, and since:

$$E[|A_{\mu,\lambda}|^2] = \mu^2 + \lambda^2,$$

we have:

$$v(\mu,\lambda) := \text{var}+[A_{\mu,\lambda}] = \mu^2\lambda^2 - m(\mu,\lambda)^2.$$

We can use these quantities to analyze the distribution of the test statistic $\tilde{g}_i(\tilde{\rho})$ in the various cases. Note that in our model $\tilde{\rho}_m$ is a random variable consisting of a sum of two parts. The noise term, which is the same under all hypotheses, is a complex normal with variance $\eta^2 = L/\gamma$, so that real and imaginary components have variance $\lambda^2 := \eta^2/2 = L/2\gamma$. The demapping error term is a random variable taking values on the complex integer lattice, whose distribution depends on the hypothesis.

Recall the definition of $\tilde{g}_1$ in (6). For convenience, let us define the notation:

$$S_r = \frac{1}{M}\sum_m |u_m| \text{ and } S_i = \frac{1}{M}\sum_m |v_m|,$$

so that:

$$\tilde{g}_1(\tilde{\rho}) = \max\{S_r, S_i\}.$$

Since $S_r$ and $S_i$ are independent, the cumulative Distribution Function (CDF) $F(\tau, \tilde{g}_1)$ of the test statistic can be expressed as the product of the CDFs of $S_r$ and $S_i$ since:

$$P\{\tilde{g}_1 \leq \tau\} = P\{S_r \leq \tau \cap S_i \leq \tau\} = P\{S_r \leq \tau\}P\{S_i \leq \tau\} = F(\tau; S_r)F(\tau; S_i).$$

Case 0—No Demapping Errors:

In this case, both $S_r$ and $S_i$ are empirical means of M random variables of the form $A_{0,\lambda}$, and so they have mean:

$$E[S_r] = E[S_i] = m(0,\lambda) = \sqrt{2/\pi}\lambda,$$

and variance:

$$\text{var}[S_r] = \text{var}[S_i] = v(0,\lambda)/M = \frac{(1-2/\pi)\lambda^2}{M}.$$

When M is reasonably large, and if we are not estimating extreme tails of the distribution, we model the distributions of $S_r$ and $S_i$ as approximately Gaussian with CDF:

$$F(\tau; S_r \mid H_0) = F(\tau; S_i \mid H_0) \approx 1 - Q\left(\left(\frac{\tau - m(0,\lambda)}{\sqrt{v(0,\lambda)/M}}\right)\right),$$

so that:

$$F(\tau; \tilde{g}_1 \mid H_0) \approx \left[1 - Q\left(\left(\frac{\tau - m(0,\lambda)}{\sqrt{v(0,\lambda)/M}}\right)\right)\right]^2.$$

For a given variance $\lambda$, the minimal threshold $\theta_0$ required to ensure that the false alarm probability is below $\epsilon$ is obtained by solving the equation:

$$F(\theta_0; \tilde{g}_1 \mid H_0) = 1 - \epsilon.$$

This equation can be solved explicitly in terms of the inverse of the Q function as:

$$\theta_0 = m(0,\lambda) + \sqrt{v(0,\lambda)/M} Q^{-1}(1-\sqrt{1-\epsilon}) = \lambda(\sqrt{2/\pi} + \sqrt{(1-2/\pi)/M} Q^{-1}(1-\sqrt{1-\epsilon})).$$

Figure 4:
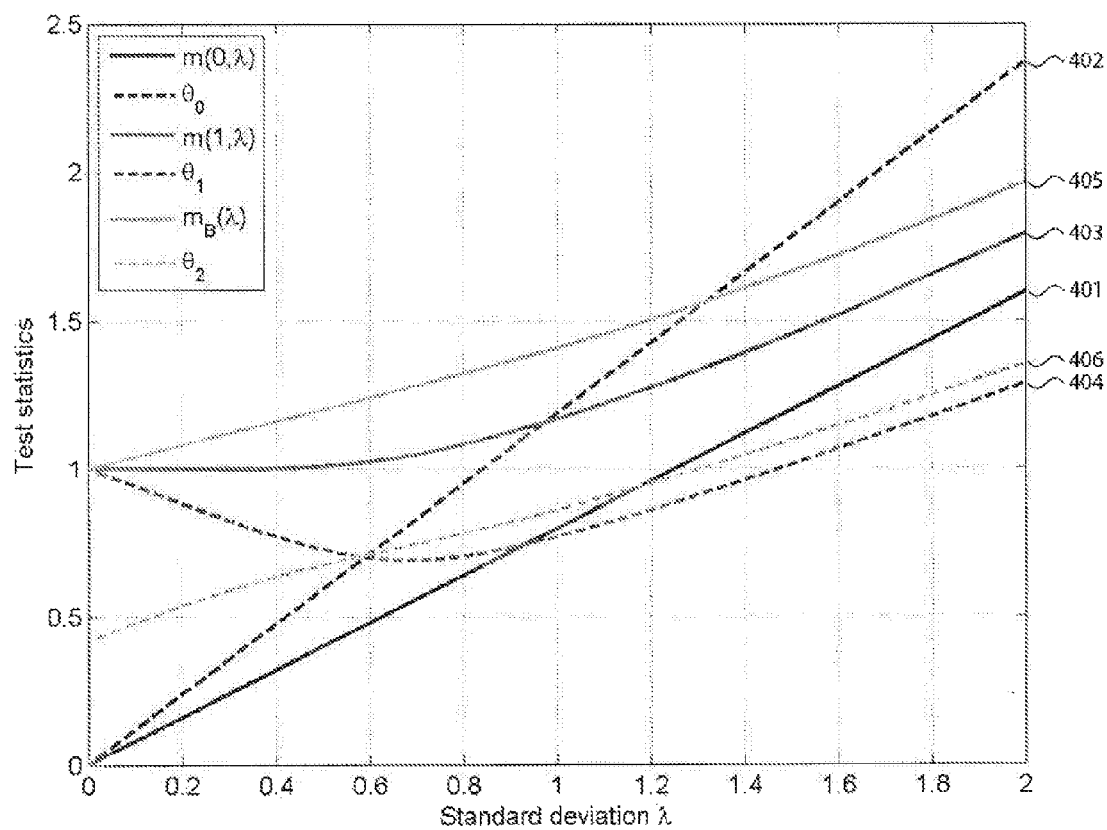
FIG. 4 represents a plot of the mean and quantile values of a test statistic gi used for detection of demapping errors as a function of the noise standard deviation, and using 16 unassigned pilots.

In this case the minimal threshold scales linearly with the standard deviation $\lambda$ of the noise. The mean value of $\tilde{g}_1$ and the threshold $\theta_0$ needed for $\epsilon = 1\%$ false alarm probability are depicted in FIG. 4 as a function of $\lambda$ as solid and dashed curves 401 and 402 respectively (M=16).

Case 1—Single Demapping Error:

In this case, the component affected by the error, either $S_r$ or $S_i$, is the average of M random variables of the form $A(1,\lambda)$, while the other component is an average of variables of the form $A(0,\lambda)$. Assume without loss of generality that the demapping error is real. Then $E[S_r] = m(1,\lambda)$ and $\text{Var}[S_r] = v(1,\lambda)/M$, while $E[S_i] = m(0,\lambda)$ and $\text{Var}[S_i] = v(0,\lambda)/M$. Again using a Gaussian approximation, we get:

$$F(\tau; \tilde{g}_1 \mid H_1) \approx \left[1 - Q\left(\left(\frac{\tau - m(1,\lambda)}{\sqrt{v(1,\lambda)/M}}\right)\right)\right]\left[1 - Q\left(\left(\frac{\tau - m(0,\lambda)}{\sqrt{v(0,\lambda)/M}}\right)\right)\right].$$

For a given variance $\lambda$, the maximum threshold $\theta_1$ that ensures that the missed detection probability is below $\epsilon$ is obtained by numerically solving the equation:

$$F(\theta_1; \tilde{g}_1 \mid H_1) = \epsilon.$$

The mean value of $\tilde{g}_1$ and the threshold $\theta_1$ needed for $\epsilon = 1\%$ missed detection probability are depicted in FIG. 4 as a function of $\lambda$ as solid and dashed curves 403 and 404 respectively (M=16). The mean is approximately constant for small $\lambda$ and monotonically increasing. On the other hand, the 1% quantile value initially decreases (due to increasing variance) reaching a global minimum of approximately 0.69. The false alarm and missed detection probabilities can both be kept below 1% as long as the dashed curve 404 lies above the dashed curve 402.

Case 2—Double Demapping Error:

Here we consider the case of a double demapping error, in the more difficult case in which both demapping errors are real or both are imaginary (identical twin scenario). Suppose without loss of generality that both demapping errors are real. Then, when correlating the error feedback with each unassigned pilot $T_m$, there is a 50% chance that the two errors will add constructively, and a 50% chance that the two errors will cancel each other out. Then $S_r$ is the average of random variables which are a mixture of variables of type $A(0,\lambda)$ and $A(2,\lambda)$. If the random variable B is such a mixture, then its first and second order moments are:

$$m_B(\lambda) = E[B] = \frac{1}{2}m(0,\lambda) + \frac{1}{2}m(2,\lambda),$$

$$E[B^2] = \frac{1}{2}\lambda^2 + \frac{1}{2}(4+\lambda^2) = \lambda^2 + 2,$$

$$V_B(\lambda) = \text{var}[B] = 2 + \lambda^2 - m_B(\lambda)^2.$$

We then have $E[S_r] = m_B(\lambda)$ and $\text{var}[S_r] = v_B(\lambda)/M$, while the imaginary component has statistics $E[S_i] = m(0,\lambda)$ and $\text{Var}[S_i] = v(0,\lambda)/M$. Again using a Gaussian approximation for the CDF, we get $$F(\tau; \tilde{g}_1 \mid H_2) \approx \left[1 - Q\left(\left(\frac{\tau - m_B(\lambda)}{\sqrt{v_B(\lambda)/M}}\right)\right)\right]\left[1 - Q\left(\left(\frac{\tau - m(0,\lambda)}{\sqrt{v(0,\lambda)/M}}\right)\right)\right].$$

For a given variance $\lambda$, the maximum threshold $\theta_2$ that ensures that the missed detection probability is below $\epsilon$ is obtained by numerically solving the equation:

$$F(\theta_2; \tilde{g}_1 | H_2) = \epsilon.$$

The mean value of $\tilde{g}_1$ and the threshold $\theta_2$ needed for $\epsilon=1\%$ missed detection probability are depicted in FIG. 4 as a function of $\lambda$ as solid and dashed curves 405 and 406 respectively (M=16). Unlike in the case of a single error, the variance of $\tilde{g}_1$ does not go to zero as $\lambda \to 0$ because of the variability introduced by the constructive and destructive sum of the two errors. The mean and the 1% quantile both increase monotonically as a function of $\lambda$. For this reason, the double error threshold $\theta_2$ is more stringent than the single error threshold at low values of $\lambda$, while the opposite is true for higher values of $\lambda$.

Other Cases:

We would like our detector to work well for all combinations of real and imaginary demapping errors. We believe the two cases we have studied (single and identical twin) errors are uniformly the most stringent cases. That is, for any other combination, the missed detection probability should be lower than the maximum missed detection of these two cases. Thus, it is sufficient to design a test that gives acceptable performance or single and double demapping errors.

Detector Designs

The results of the previous section indicate bounds on the decision threshold $\theta$ that are required as a function of the noise level $\lambda$. In practice, the noise level is not known a priori, and must be estimated if it is to be used explicitly in the test. In this section we consider two strategies for setting the threshold. Regardless of the strategy, low false alarm rates and missed detection rates can be achieved simultaneously only for $\lambda$ below a certain level. In designing our tests, we will take the approach of putting constraints on missed detection rates, and trying to maximize the noise levels for which we can also keep false alarm rates low.

Flat Detector:

In the first strategy, we choose a single value $\theta_f$ that universally guarantees a desired upper bound on missed detection for all noise levels $\lambda$. The detection rule is then simply to declare a demapping error whenever $\tilde{g}_1(\tilde{\rho}) > \theta_f$.

Ramp Detector:

In the second strategy, we attempt to estimate $\lambda$, and use this estimate to optimize the threshold $\theta$. We use an estimate of $\lambda$ that is insensitive to demapping errors, but which is only accurate for noise levels below about $\lambda=0.3$ (see further in the description). In this strategy, we determine a threshold $\theta_r$ that guarantees low missed detection rate for $\lambda \geq 0.3$. This threshold is applied when the estimated noise $\hat{\lambda}$ is large, $\hat{\lambda} \geq 0.3$. When the estimated noise $\hat{\lambda}$ is small, we use a linearly increasing threshold $\theta(\hat{\lambda}) = \theta_r \hat{\lambda}/0.3$.

Using the analysis of the previous section, we can compute the minimal missed detection thresholds $\theta_1(\lambda)$ and $\theta_2(\lambda)$ as a function of the background noise level. Then, the global threshold for the flat detector is calculated as:

$$\theta_f = \min_{\lambda \geq 0} \{\min\{\theta_1(\lambda), \theta_2(\lambda)\}\}, \quad (7)$$

and the threshold for the ramp detector is calculated as:

$$\theta_r = \min_{\lambda \geq 0.3} \{\min\{\theta_1(\lambda), \theta_2(\lambda)\}\}. \quad (8)$$

Figure 5:
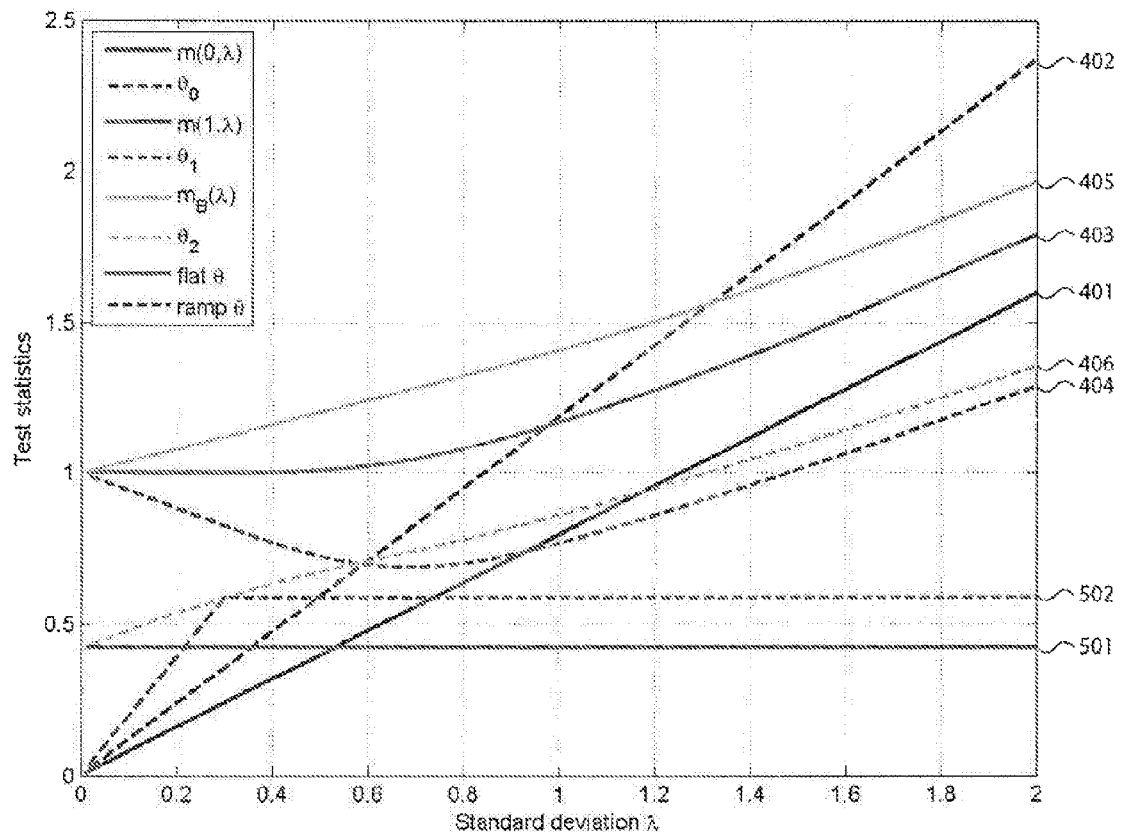
FIG. 5 represents a plot of the thresholds for the flat and ramp detectors as a function of the noise standard deviation, still using 16 unassigned pilots.

In FIG. 5, the statistics of $\tilde{g}_1$ for the case M=16 unassigned pilots, first given in FIG. 4, are replotted. In addition, the solid curve 501 shows the detection boundary used by the flat detector, namely a constant value $\theta_f=0.45$, limited by the value of $\theta_2(0)$. The dashed curve 502 shows the detection boundary used by the ramp detector, namely a linearly increasing value for $\lambda \leq 0.3$, and the constant value $\theta_r=0.58$ for $\lambda > 0.3$. With increasing M, the missed detection thresholds (dashed curves 402, 404 and 406) are pulled closer to their corresponding mean values (solid curves 401, 403 and 405 respectively), allowing the thresholds $\theta_f$ and $\theta_r$ to increase, which in turn increases the variance $\lambda$ that can be supported with low false alarm rate.

In this figure, the noise level $\lambda^*$ at which the solid curve 401 crosses the curves 501 or 502 marks the point at which the mean of the test statistic $\tilde{g}_1$ under the null hypothesis (no demapping errors) is equal to the test threshold $\theta_f$ of or $\theta_r$, respectively. At this point (since the mean and median are approximately equal for these distributions), the false alarm probability reaches about 50%. Hence, $\lambda^*$ can be thought of as the right-most boundary of low-false-alarm operation; operating at noise levels above $\lambda^*$ leads to a high false alarm rate. For a given pilot length L, we can compute a corresponding single user SNR value $\gamma^* = L/(2\lambda^{*2})$. Applying the detector on tones with single-user SNR below $\gamma^*$ will result in high false alarm rates.

Let us now examine the respective performances of the so-designed flat and ramp detectors. In the preceding section, we have designed demapping error detectors with the following criteria. Within a given design (flat or ramp), we attempted to keep the false alarm performance as low as possible while ensuring that the missed detection probability, for single and double demapping errors, was below $\epsilon=0.01$. In this section, we report on Monte Carlo simulation to verify the performance of the designed detectors. In each experiment, we generated M complex random variables under each of several hypotheses: no demapping errors, double (identical twin) demapping errors, three demapping errors, and four demapping errors. In the case of the ramp detector, we computed an estimated variance level $\hat{\lambda}$ to determine the appropriate threshold $\theta$ to use. With either detector, we computed the test statistic $\tilde{g}_1$ and compared it to the threshold $\theta$. Finally, each incorrect result was classified as a false alarm or missed detection, and the average rates of false alarm and missed detection where computed over 100,000 trials. This process was repeated for a variety of different levels of $\lambda$ to produce error rates as a function of single user SNR $\gamma$.

Figure 6:
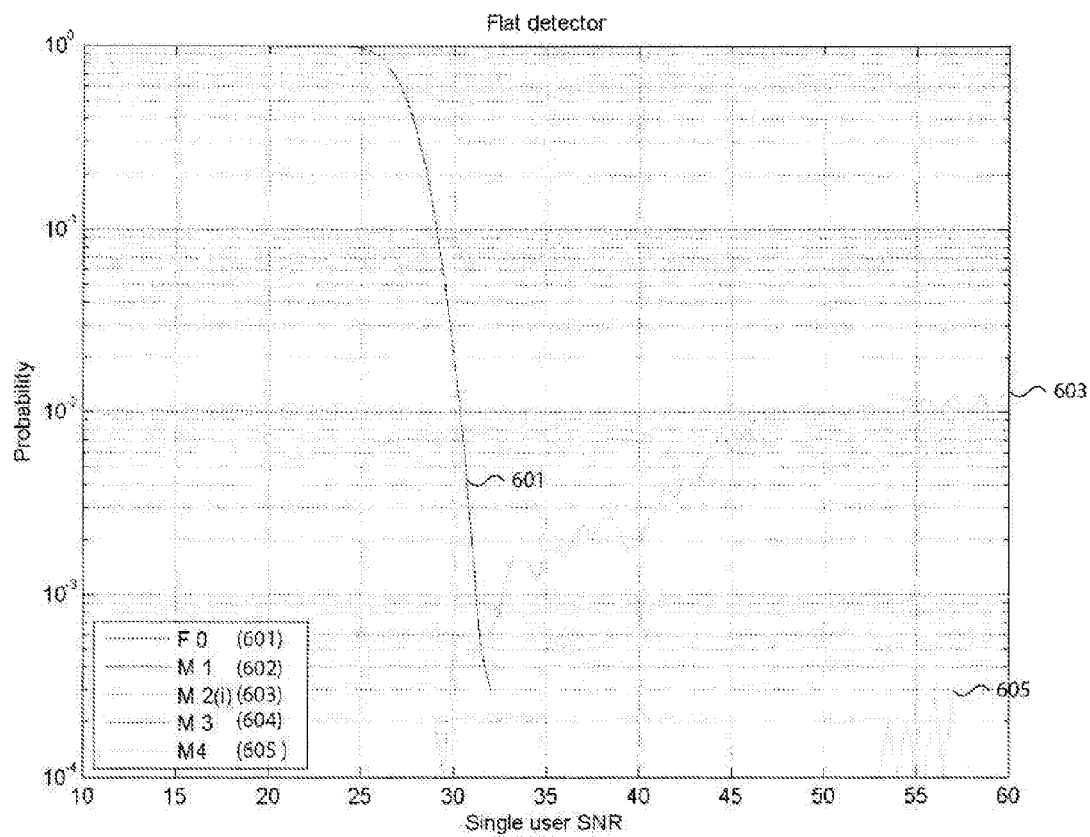
FIGS. 6 and 7 represent false alarm and missed detection rates for the flat and ramp detectors respectively plotted as a function of single user SNR, still using 16 unassigned pilots.
Figure 7:
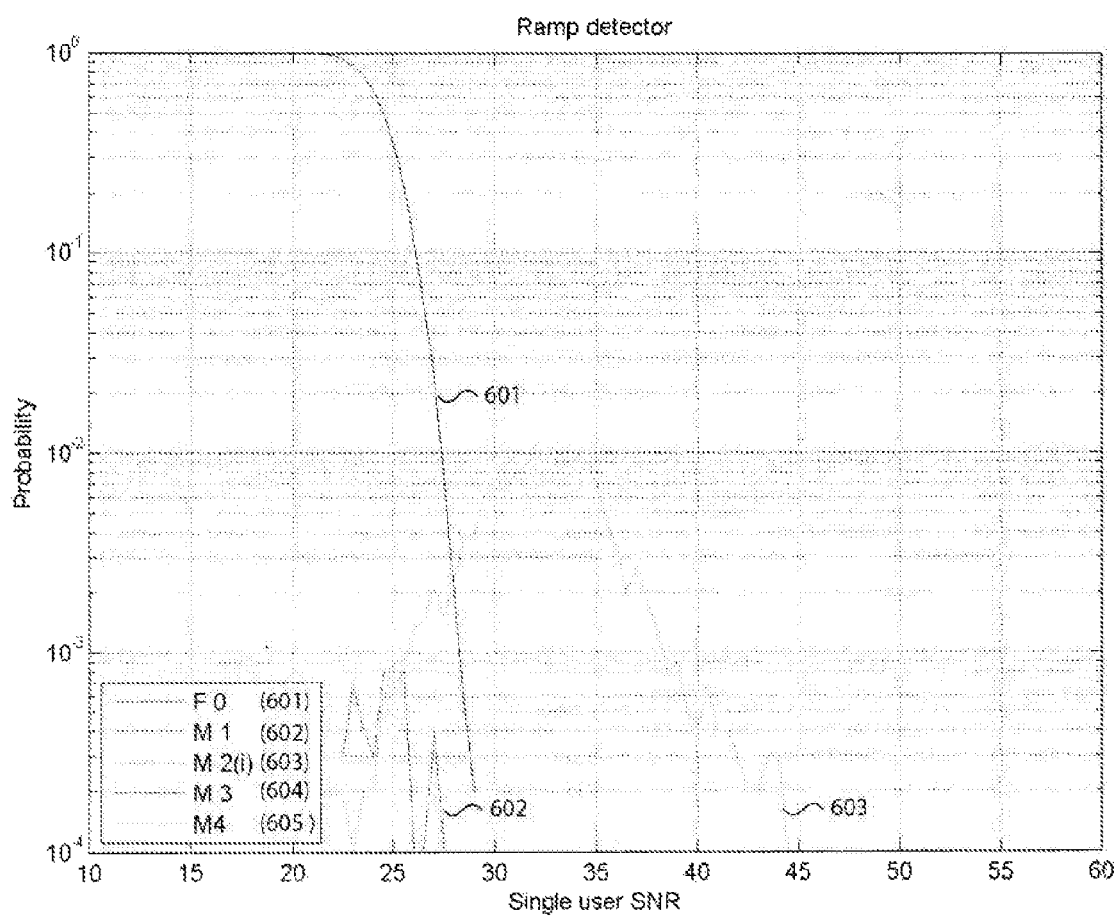

False alarm rates (curves 601 and 701) as a function of the single user SNR level $\gamma$, along with missed detection rates for one (curves 602 and 702), two (curves 603 and 703), three (curves 604 and 704), and four (curves 605 and 705) demapping errors, are plotted in FIGS. 6 and 7 for the flat and ramp detectors respectively using M=16 unassigned pilots.

In all cases, the missed detection rates are bounded by $\epsilon=0.01$ as designed. In general, the flat detector has its worst missed detection at high SNR, while for the ramp detector, the worst missed detection occurs at the break point of the ramp, about 32 dB. Similar curves can be computed for other values of the system parameters.

Estimating the Background SNR Level

In this section, we provide details and motivation for the background noise level estimator $\hat{\lambda}$ that is used for the ramp detector. If the actual background noise level $1/\gamma$ (and hence $\lambda^2$) was known, thresholds could be perfectly optimized for each situation. However, in practice estimation of $\lambda^2$ is not straightforward in the presence of demapping errors. However, in our application, it is sufficient to estimate $\lambda^2$ when it is low, i.e. when the SNR $\gamma$ is high. Recall that the random variable $\tilde{\rho}_m$ is the sum of a complex normal noise with variance $2\lambda^2$ with demapping error term which lies on the complex integer grid. When $\lambda^2$ is small, the demapping error component can be recovered with high probability by simply rounding $\tilde{\rho}_m$ to the complex integer grid. Denoting the rounding function as $\lfloor \tilde{\rho}_m \rceil$, the noise can then be estimated as $\tilde{\rho}_m - \lfloor \tilde{\rho}_m \rceil$.

For a real normal variable X with unit variance, $E[|X|] = \sqrt{2/\pi}$. Thus, one way to estimate the standard deviation $\lambda$ of the real part and imaginary parts of the noise component of $\tilde{\rho}$ is via the estimator:

$$\hat{\lambda} = \frac{\sqrt{\pi/2}}{2M}\left(\sum_m |u_m - \lfloor u_m \rceil| + \sum_m |v_m - \lfloor v_m \rceil|\right). \quad (9)$$

Figure 8:
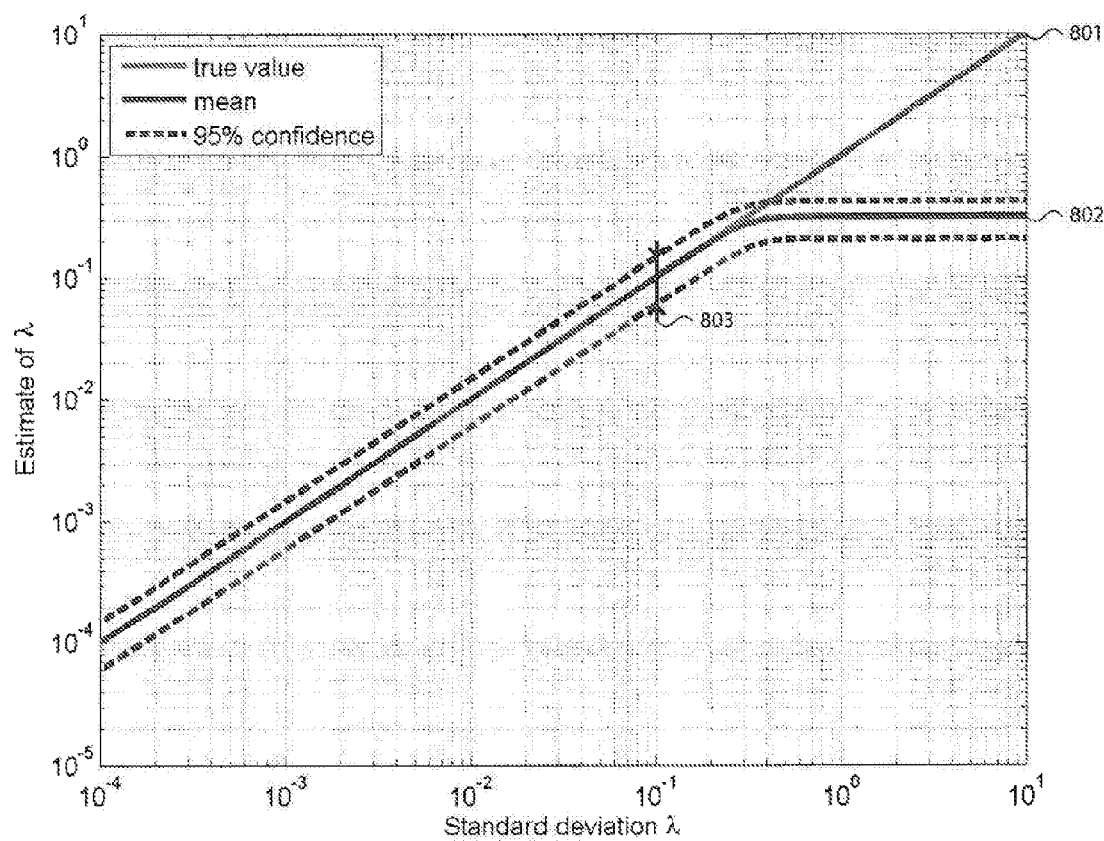
FIG. 8 represents a plot of the mean value and confidence intervals for an estimator of the noise standard deviation as a function of the true value, using 8 unassigned pilots.

This estimate is (effectively) unbiased if $\lambda$ is small enough so that $u_m \lfloor u_m \rceil$ accurately captures the real component of the noise, and so on. As $\lambda$ increases, this no longer holds and the estimator saturates. FIG. 8 below depicts the empirically measured mean 802 and 95% confidence interval 803 for the estimator $\hat{\lambda}$ as a function of the true standard deviation $\lambda$ 801.

The key observation to make is that if the estimated standard deviation satisfied $\hat{\lambda} < 0.25$, then we can suppose we are in the unbiased regime, and have a fairly accurate estimate of $\eta$. On the other hand, if $\hat{\lambda} > 0.25$, we may be in the biased region, and may have $\lambda \gg \hat{\lambda}$.

Because the estimator $\hat{\lambda}$ is not affected by integer shifts of the input, it has the same distribution and performance whether or not demapping errors are present. Hence, in the ramp detector, we first use $\hat{\lambda}$ to determine the noise level (if small), or determine that the noise level is large. An adaptive threshold $\theta(\hat{\lambda})$ is set accordingly, after which the statistic $\tilde{g}_1$ is compared to the threshold.

In a properly designed ramp detector, we always have $\theta_r > \sqrt{2/\pi}$. By examining the formulas for $\tilde{g}_1$, $\hat{\lambda}$ and $\theta(\hat{\lambda})$, it is easy to see that when the correlation values $\tilde{\rho}_m$ are small enough that $\lfloor \tilde{\rho}_m \rceil = 0$ for all unassigned pilots, we get $\tilde{g}_1(\rho) < \theta(\hat{\lambda})$, and choose the null hypothesis. Some computation can be saved therefore by directly declaring the null hypothesis in this case, without having to explicitly compute $\hat{\lambda}$ or $\tilde{g}_1$.

VCU Practical Implementation

Based on the foregoing analysis and simulations, we present here in explicit form the recommended demapping error detectors for use within the VCU 130.

The input parameters are:
the detector type—either flat or ramp;
the number M of unassigned pilots that will be used;
the missed detection rate $\epsilon$; and
the pilot sequence length L.

The input data for the test is a sequence of complex error feedback values, $\{E_t\}$, for $t=0, \ldots, L-1$ (on a particular tone). Also, M unassigned pilot sequences of length L are specified by values $T_{mt} \in \{-1,1\}$.

Flat Detector:

The flat detector has the following steps.

Step 1: The threshold $\theta_f$ is computed based on M and $\epsilon$, using equation (7). These values can be pre-computed in a table, for example.

Step 2: For each m=1, . . . , M, compute the correlation values:

$$u_m = \frac{1}{\sqrt{2}} \sum_{t=0}^{L-1} \mathcal{R}(E_t) T_{mt}, \text{ and}$$

$$v_m = \frac{1}{\sqrt{2}} \sum_{t=0}^{L-1} \mathcal{J}(E_t) T_{mt}.$$

Step 3: Compute the test statistics:

$$S_r = \frac{1}{M} \sum_m |u_m|, \text{ and}$$

$$S_i = \frac{1}{M} \sum_m |v_m|.$$

Step 4: If $\max\{S_r, S_i\} > \theta_f$, declare a demapping error. Else, no demapping error.

Ramp Detector:

The ramp detector has the following steps.

Step 1: The threshold $\theta_r$ is computed based on M and $\epsilon$, using equation (8). These values can be pre-computed in a table, for example.

Step 2: For each m=1, . . . , M, compute the correlation values:

$$u_m = \frac{1}{\sqrt{2}} \sum_{t=0}^{L-1} \mathcal{R}(E_t) T_{mt}, \text{ and}$$

$$v_m = \frac{1}{\sqrt{2}} \sum_{t=0}^{L-1} \mathcal{J}(E_t) T_{mt}.$$

Step 3: For each m=1, . . . , M, round $u_m$ and $v_m$ to nearest integer values, to obtain $\tilde{u}_m = \lfloor u_m \rceil$, and $\tilde{v}_m = \lfloor v_m \rceil$.

Step 4: if $\tilde{u}_m = 0$ and $\tilde{v}_m = 0$ for all m=1, . . . , M, declare no demapping error. Else, continue to the next step.

Step 5: Compute the standard deviation estimate $\hat{\lambda}$ as per equation (9).

Step 6: Compute the threshold $\theta = \theta_r \min\{1, \hat{\lambda}/0.3\}$.

Step 7: Compute the test statistics:

$$S_r = \frac{1}{M} \sum_m |u_m|, \text{ and}$$

$$S_i = \frac{1}{M} \sum_m |v_m|.$$

Step 8: If $\max\{S_r, S_i\} > \theta$, declare a demapping error. Else, no demapping error.

In implementing the above detectors, various simplifications can be employed. For example, the factors $1/\sqrt{2}$ in the definition of $u_m$ and $v_m$ could be incorporated into the thresholds rather than being explicitly calculated.

Mitigating the Effects of Demapping Errors

There are four types of detection and correction of demapping errors that can be considered:

Estimate the accuracy of each row of the estimated crosstalk matrix $\hat{\Theta}$.

Estimate whether or not a demapping error is present in the error feedback of a particular line.

Estimate how many demapping errors have affected the error feedback of a particular line.

Determine exactly which demapping errors occurred, and compensate for them precisely.

Using the above as tools, the following strategies can be used to mitigate the effects of demapping errors:

Design pilot sequences to be less prone to estimation errors—especially repeated errors. Use a randomized Hadamard construction, for example.

Estimate the accuracy of crosstalk estimates, and use this information to be more or less aggressive in tracking.

Detect the presence of demapping errors, and discard or give lower weight to associated residual crosstalk estimates.

Detect specific demapping errors and make corresponding corrections to the associated residual crosstalk estimates.

The next step to investigate is whether using an estimate for the accuracy of estimation can help avoid this problem. The idea is that, from initialization onward, the precoder updates would be very conservative when accuracy is thought to be poor, and more aggressive when accuracy is better. This should help in converging to the right precoder.

Using Estimates of Crosstalk Measurement Accuracy

We explained how correlation of error feedback signals with unassigned pilot sequences can generate useful information about the accuracy of crosstalk estimates, even when there are no demapping errors. In this section we provide more detail on this idea.

We suppose, as previously discussed, that we have a number of pilot sequences $\{S_m\}$ that are assigned to DSL lines and used for sending SYNC symbols, and that we have other unassigned pilot sequences $\{T_m\}$, with all pilots being mutually orthogonal. In contrast to before, we now assume that there are no demapping errors, i.e. that $W=0$. Then the result of correlating the error feedback samples $E_n$ on line n with an assigned pilot $S_m$ yields:

$$\rho_n(S_m) := \frac{E_n S_m^T}{L} = a\sigma_n^{-1}\Theta_{nm}\sigma_m + \frac{Z_n S_m^T}{L},$$

whereas correlating with an unassigned pilot $T_m$ yields the value:

$$\rho_n(T_m) := \frac{E_n T_m^T}{L} = \frac{Z_n T_m^T}{L}.$$

In both cases, the result has a deterministic component and a random component, with the random component being the result of correlating background noise with the pilot sequence. The random component is statistically the same for all correlation results for the same victim lime, and has variance:

$$v_n = \text{var}[\rho_n(T_m)] = \frac{1}{L}E[|Z_{nt}|^2]$$

The value $v_n$ expresses on average how close the correlation results $\rho_n(S_m)$ are to their mean values. The smaller the variance $v_n$, the more reliable the crosstalk estimates $\hat{\Theta}_{nm}$. In particular, since the crosstalk estimate $\hat{\Theta}_{nm} = \rho_n(S_m) \sigma_n \sigma_m^{-1} a^{-1}$ is a scaled version of the correlation result, it has variance:

$$\text{var}[\hat{\Theta}_{nm}] = v_n \sigma_n^2 / \sigma_m^2$$

Because the results of correlating with unassigned pilots are zero-mean and identically distributed, we can estimate their variance using the usual empirical variance estimate:

$$\hat{v}_n = \frac{1}{M-1}\sum_{m=1}^{M}|\rho_n(T_m)|^2,$$

which becomes more accurate as the number of unassigned pilots M increases. Normalizing the result by $\tilde{g}_n^2/\sigma_m^2$, then gives an estimate of the uncertainty in our estimate $\hat{\Theta}_{nm}$.

Having an idea of the reliability of the crosstalk estimates on different victim lines and on different tones can be very useful for a vectored system. This information allows optimization of the way in which different estimates can be combined in to a new estimate.

In one embodiment, knowledge of the variance of residual crosstalk estimates made at different times can be used to combine multiple estimates optimally, increasing the accuracy of precoder coefficients over time. Suppose that for a particular victim and disturber pair, at time t, we have an estimate $\hat{C}[t]$ of the ideal precoder value, and that we know (or estimate) the variance of this estimate to be $w[t]$. Suppose we set the precoder to this value, so that at time t+1, the precoder value is $C[t+1]=\hat{C}[t]$. Using error feedback at time t+1, we obtain an estimate of the residual crosstalk $\hat{\Theta}[t+1]$ with variance $v[t+1]$. Then $C[t+1]-\hat{\Theta}[t+1]$ is a fresh estimate of C with variance $v[t+1]$. We can combine our fresh estimate with the previous estimate using linear weights; setting those weights to minimize the variance of the resulting updated estimate is called minimum variance combining. Applying minimum variance combining, we get a new estimate:

$$\hat{C}[t+1] = \frac{v[t+1]}{w[t]+v[t+1]}C[t+1] + \frac{w[t]}{w[t]+v[t+1]}(C[t+1]-\hat{\Theta}[t+1])$$
$$= C[t+1] - \frac{w[t]}{w[t]+v[t+1]}\hat{\Theta}[t+1].$$

The new estimate has variance:

$$w[t+1]=w[t]v[t+1]/(v[t+1]+w[t]) \quad (10),$$

which is always smaller than $w[t]$ (and $v[t+1]$). Although the variances $w[t]$ and $v[t+1]$ aren't known in practice, correlation with unassigned pilots as described above can be used to estimate $v[t+1]$ at each stage. An estimate of the variance $w[t]$ can be maintained iteratively using equation (10).

In another embodiment, information about crosstalk estimation variance can be used to optimally combine crosstalk estimates made on different sub-carriers. For example, suppose that it is expected that two tones f and f+k separated by a small number of tones k have the same ideal crosstalk coefficient C. Using error feedback on tone f, we obtain estimate $\hat{C}[f]$ with variance $v[f]$, and using error feedback on tone f+k we obtain estimate $\hat{C}[f+k]$ with variance $v[f+k]$. Again using the principle of minimum variance combining, we can form a combined estimate:

$$\hat{C} = \frac{v[f+k]}{v[f]+v[f+k]}\hat{C}[f] + \frac{v[f]}{v[f]+v[f+k]}\hat{C}[f+k].$$

When both estimates have similar variance, the new estimate is simply the average of the two. On the other hand, if one estimate has much higher variance than the other then the combining procedure gives much more weight to the more reliable measurement. Reasons for frequency dependence in estimation accuracy could include frequency-dependent noise (such as due to radio frequency ingress) or frequency-dependent transmit powers.

The mitigation technique of detecting demapping errors and discarding residual crosstalk estimates affected by demapping errors can be thought of as an extension of this approach. Namely, if demapping errors are present, we may think of the resulting estimates as being completely unreliable, and formally set the estimated variance $\hat{v}$ to infinity. When applying the minimum variance combining principle, this corresponds to discarding measurements with demapping errors. For example, formally if $v[f]=\infty$ and $v[f+k]=1$, the minimum variance combining principle would dictate $\hat{C}=\hat{C}[f+k]$, essentially ignoring or discarding the corrupted measurement.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A vectoring controller comprising:
    a memory having computer readable instructions stored thereon; and
    at least one processor configured to execute the computer readable instructions to,
    estimate at least one crosstalk coefficient at a given carrier frequency from at least one respective disturber line towards a victim line of a vectoring group,
    assign at least one crosstalk probing sequence out of a set of orthogonal crosstalk probing sequences to the at least one respective disturber line for modulation at the given carrier frequency of at least one respective sequence of crosstalk probing symbols,
    receive error samples as successively measured by a receiver coupled to the victim line at the given carrier frequency while the at least one sequence of crosstalk probing symbols are being transmitted over the at least one respective disturber line, and
    correlate the received error samples with at least one unassigned crosstalk probing sequence out of the set of orthogonal crosstalk probing sequences for detection of a demapping error in the received error samples, the at least one unassigned crosstalk probing sequence being not actively used by any line of the vectoring group during the transmission of the at least one sequence of crosstalk probing symbols over the at least one respective disturber line.

2. A vectoring controller according to claim 1, wherein the vectoring controller is further configured to keep a desired number M of crosstalk probing sequences out of the set of orthogonal crosstalk probing sequences unassigned and available for detection of demapping errors.

3. A vectoring controller according to claim 2, wherein the set of orthogonal crosstalk probing sequences comprises crosstalk probing sequences of length L greater than or equal to N+M, N denoting the size of the vectoring group.

4. A vectoring controller according to claim 1, wherein the vectoring controller is further configured, if a demapping error is detected in the received error samples, to discard the received error samples for estimation of the at least one crosstalk coefficient.

5. A vectoring controller according to claim 1, wherein the vectoring controller is further configured to estimate the at least one crosstalk coefficient using a weighted combination of a new crosstalk estimate based on the received error samples and at least one further crosstalk estimate, and
    wherein the weight applied to the new crosstalk estimate is a function of whether a demapping error has been detected in the received error samples.

6. A vectoring controller according to claim 1, wherein the vectoring controller is further configured to estimate the at least one crosstalk coefficient using a weighted combination of a new crosstalk estimate based on the received error samples and at least one further crosstalk estimate,
    wherein the vectoring controller is further configured to correlate the received error samples with the at least one unassigned crosstalk probing sequence in order to determine how reliable the new crosstalk estimate is, and
    wherein the weight applied to the new crosstalk estimate is a function of the so-determined reliability of the new crosstalk estimate.

7. A vectoring controller according to claim 5, wherein the at least one further crosstalk estimate is a crosstalk estimate obtained during a previous crosstalk estimation cycle.

8. A vectoring controller according to claim 5, wherein the at least one further crosstalk estimate is a crosstalk estimate obtained at a further carrier frequency nearby the given carrier frequency.

9. A vectoring controller according to claim 1, wherein the received error samples are indicative of error vectors between received frequency samples at the given carrier frequency and respective selected constellation points onto which the received frequency samples are demapped.

10. A vectoring controller according to claim 1, wherein the vectoring controller is further configured to use the result of the correlation of the received error samples with the at least one unassigned crosstalk probing sequence in a statistic, and to compare that statistic with a threshold to determine with a certain confidence whether a demapping error is present in the received error samples.

11. A vectoring controller according to claim 10, wherein the threshold value depends on the noise level at the given carrier frequency.

12. A vectoring controller according to claim 10, wherein the statistic is given by $$\max\left\{\frac{1}{M}\sum_{m}|u_m|, \frac{1}{M}\sum_{m}|v_m|\right\},$$

M being a non-null positive integer denoting a given number of unassigned pilot sequences for detection of demapping errors, $u_m$ and $v_m$ denoting the real and imaginary part respectively of the correlation of the error samples with a given one of the at least one unassigned crosstalk probing sequence.

13. An access node comprising a vectoring controller according to claim 1.

14. An access node according to claim 13, wherein the access node is a Digital Subscriber Line Access Multiplexer DSLAM.

15. A method comprising:
estimating at least one crosstalk coefficient at a given carrier frequency from at least one respective disturber line towards a victim line of a vectoring group,
assigning at least one crosstalk probing sequence out of a set of orthogonal crosstalk probing sequences to the at least one respective disturber line for modulation at the given carrier frequency of at least one respective sequence of crosstalk probing symbols,
receiving error samples as successively measured by a receiver coupled to the victim line at the given carrier frequency while the at least one sequence of crosstalk probing symbols are being transmitted over the at least one respective disturber line, and
correlating the received error samples with at least one unassigned crosstalk probing sequence out of the set of orthogonal crosstalk probing sequences for detection of a demapping error in the received error samples, the at least one unassigned crosstalk probing sequence being not actively used by any line of the vectoring group during the transmission of the at least one sequence of crosstalk probing symbols over the at least one respective disturber line.

* * * * *